US012485595B2

(12) United States Patent
Chen et al.

(10) Patent No.: US 12,485,595 B2
(45) Date of Patent: Dec. 2, 2025

(54) INJECTION MOLDING SYSTEM AND INJECTION MOLDING METHOD

(71) Applicant: KING STEEL MACHINERY CO., LTD., Taichung (TW)

(72) Inventors: Ching-Hao Chen, Taichung (TW); Liang-Hui Yeh, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 129 days.

(21) Appl. No.: 18/451,073

(22) Filed: Aug. 16, 2023

(65) Prior Publication Data

US 2024/0123662 A1 Apr. 18, 2024

Related U.S. Application Data

(60) Provisional application No. 63/379,255, filed on Oct. 12, 2022.

(51) Int. Cl.
| | | |
|---|---|---|
| B29C 45/28 | (2006.01) | |
| B29C 45/17 | (2006.01) | |
| B29C 45/27 | (2006.01) | |

(52) U.S. Cl.
CPC ...... *B29C 45/2803* (2013.01); *B29C 45/1781* (2013.01); *B29C 2045/2791* (2013.01)

(58) Field of Classification Search
CPC ............ B29C 45/2803; B29C 45/1781; B29C 2045/2791; B29C 45/1761; B29C 31/042;
(Continued)

(56) References Cited

U.S. PATENT DOCUMENTS

| | | | | |
|---|---|---|---|---|
| 3,963,401 A | * | 6/1976 | Latter ................. | B29C 45/1781 425/574 |
| 2003/0108639 A1 | * | 6/2003 | Provencher ............ | B29C 45/07 425/574 |
| 2023/0010076 A1 | * | 1/2023 | Halford ............... | B29C 45/7312 |

FOREIGN PATENT DOCUMENTS

JP 2021014115 A 2/2021

OTHER PUBLICATIONS

Notice of Reasons for Rejection from the Japan Intellectual Property Office of JP patent application No. 2023-146162 dated Oct. 1, 2024.

* cited by examiner

*Primary Examiner* — Jacob T Minskey
*Assistant Examiner* — Elisa H Vera
(74) *Attorney, Agent, or Firm* — WPAT LAW; Anthony King

(57) ABSTRACT

An injection molding system includes a supplying unit configured to supply a flowable mixture; an injection unit communicable with the supplying unit, wherein the injection unit includes an outlet configured to discharge the flowable mixture; a molding device configured to receive the flowable mixture from the outlet and includes a mold cavity and a feeding port communicable with the mold cavity and engageable with the outlet; and a supporting device disposed between the injection unit and the molding device and configured to facilitate an engagement of the injection unit and the molding device. The supporting device includes a first element connected to the injection unit and a second element disposed on the molding device. The second element includes a slot configured to receive a protruding portion of the first element, the protruding portion of the first element is slidable within and along the slot of the second element.

20 Claims, 33 Drawing Sheets

(58) Field of Classification Search
CPC ....... B29C 44/425; B29C 45/07; B29C 44/42; B29C 45/0001; B29C 45/18; B29C 2945/7699
See application file for complete search history.

500 providing an injection molding system, wherein the injection molding system includes an injection unit and a molding device, the injection unit includes an outlet configured to discharge a flowable material, and the molding device is configured to receive the flowable material from the outlet and includes a mold cavity and a feeding port communicable with the mold cavity and correspondingly engageable with the outlet — 501

Providing a supporting device configured to facilitate an engagement of the injection unit and the molding device, wherein the supporting device includes a first element connected to the injection unit and a second element disposed on the molding device — 502

Aligning a protruding portion of the first element with a slot of the second element — 503

Displacing the injection unit to slide the protruding portion of the first element along the slot of the second element — 504

Displacing the outlet in an opening of the second element to engage the outlet with the feeding port when the protruding portion of the first element is engaged with the slot of the second element — 505

Injecting the flowable material into the mold cavity — 506

FIG. 37

INJECTION MOLDING SYSTEM AND INJECTION MOLDING METHOD

CROSS-REFERENCE TO RELATED APPLICATION

This application claims priority of U.S. provisional application Ser. No. 63/379,255 filed on Oct. 12, 2022, which is incorporated by reference in its entirety.

TECHNICAL FIELD

The present invention is related to an injection-molding system and an injection-molding method, and, in particular, to an injection molding system and an injection molding method for making a foamed polymeric article.

BACKGROUND

Foamed polymer articles have many advantages, such as high strength, light weight, impact resistance, good sound insulation and thermal insulation, etc. The foamed polymer article can be made into a molded article having a predetermined shape by injection molding or extrusion molding. For example, after a polymeric material is melted and mixed with a blowing agent in an extruding system to form a flowable mixture, the mixture is injected or extruded into a molding device to form the desired foamed polymer article. The properties and qualities of foamed polymer articles can be improved by adjusting the structure of the injection molding system and adjusting the injection molding system.

BRIEF SUMMARY OF THE INVENTION

One purpose of the present invention is to provide an injection-molding system and a method of injection molding.

According to one embodiment of the present disclosure, an injection molding system is disclosed. The injection molding system includes a supplying unit configured to supply a flowable mixture of a polymeric material and a blowing agent; an injection unit communicable with the supplying unit, wherein the injection unit includes an outlet disposed distal from the supplying unit and configured to discharge the flowable mixture; a molding device configured to receive the flowable mixture from the outlet and including a mold cavity and an opening communicable with the mold cavity and correspondingly engageable with the outlet; and a supporting device configured to facilitate an engagement of the injection unit and the molding device. The supporting device includes a first element connected to the injection unit and a second element disposed on the molding device. The second element includes a slot configured to receive a protruding portion of the first element, the protruding portion of the first element is slidable within and along the slot of the second element.

According to one embodiment of the present disclosure, an injection molding method is disclosed. The molding method includes: providing an injection molding system, wherein the injection molding system includes an injection unit and the molding device, the injection unit includes an outlet configured to discharge a flowable mixture, and the molding device is configured to receive the flowable mixture from the outlet and includes a mold cavity and an opening communicable with the mold cavity and correspondingly engageable with the outlet; providing a supporting device configured to facilitate an engagement of the injection unit and the molding device, wherein the supporting device includes a first element connected to the injection unit and a second element disposed on the molding device; aligning a protruding portion of the first element with a slot of the second element; displacing the molding device toward the injection unit to slide the protruding portion of the first element along the slot of the second element; engaging the outlet with the opening when the protruding portion of the first element is engaged with the slot of the second element; and injecting the flowable mixture into the mold cavity.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 37 is a flowchart illustrating an injection molding method in accordance with some embodiments of the present disclosure.

DETAILED DESCRIPTION

Figure 1:
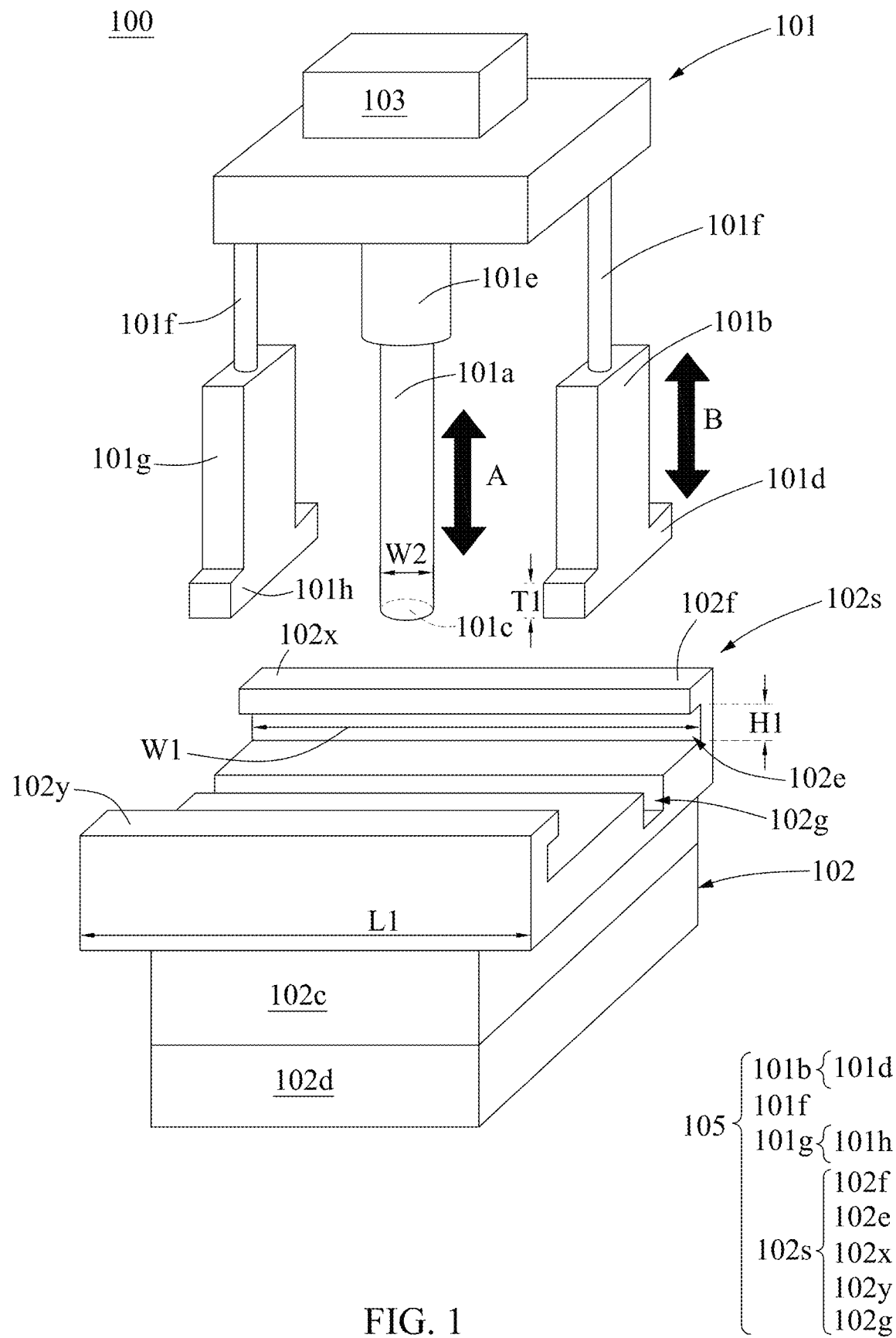
FIG. 1 is a schematic diagram of an injection molding system in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

In general, the appearance and physical properties of the foamed polymer articles are directly affected by the injection molding process, and hence, the design of the injection molding system must consider the injection condition of the flowable mixture from the injection unit into the molding device so that the flowable mixture can be injected in the molding device completely and effectively so as to form the foamed polymer article with desirable quality.

FIG. 1 illustrates a schematic perspective view of a first injection molding system 100 according to an embodiment of the present disclosure. In some embodiments, referring to FIG. 1, the first injection molding system 100 includes an injection unit 101 and a molding device 102. The injection unit 101 is engageable with the molding device 102. In some embodiments, the first injection molding system 100 further includes a flowable mixture supplying unit 103 communicable with the injection unit 101. In some embodiments, the flowable mixture supplying unit 103 is configured to produce and supply a flowable mixture to the injection unit 101.

In some embodiments, the flowable mixture includes a polymeric material such as ethylene vinyl acetate (EVA), styrene-ethylene-butylene-styrene (SEBS), thermoplastic polyurethanes (TPU), thermoplastic polyester elastomer (TPEE) or the like. In some embodiments, the flowable mixture includes a recyclable material. In some embodiments, the flowable mixture further includes a blowing agent. In some embodiments, the blowing agent can be any type of chemical or physical blowing agent known to those of ordinary skill in the art. In some embodiments, the blowing agent is a supercritical fluid. The supercritical fluid may include inert gas such as carbon dioxide or nitrogen in supercritical state. In some embodiments, the flowable mixture contains polymeric material in a molten state and the blowing agent in a liquid or supercritical fluid state mixed with the polymeric material. In some embodiments, the flowable mixture is a molding material.

In some embodiments, the flowable mixture supplying unit 103 of the first injection molding system 100 includes an extruder (not shown) for converting the polymeric material into the molten state and a mixer (not shown) for mixing the blowing agent into the polymeric material. The polymeric material is flowable from the extruder into the mixer.

In some embodiments, the injection unit 101 includes an injector 101a. In some embodiments, more than one injector 101a can be included in the injection unit 101. In some embodiments, the injector 101a is configured to receive the flowable mixture from the flowable mixture supplying unit 103 and discharge the flowable mixture from an outlet 101c. In some embodiments, the injector 101a is in a configuration of a discharging channel and the outlet 101c is disposed distal to the injector 101a and configured to discharge the flowable mixture.

In some embodiments, the injector 101a is communicable with the mixer or the flowable mixture supplying unit 103. In some embodiments, the flowable mixture is discharged from the injector 101a into the molding device 102. The injector 101a is engageable with the molding device 102. The injector 101a is extendable towards the molding device 102 and retractable from the molding device 102. In some embodiments, the injector 101a is vertically extendable/retractable in a first direction as shown by an arrow A. In some embodiments, the injector 101a is extendable/retractable by a hydraulic mechanism 101e. In some embodiments, the hydraulic mechanism 101e attaches to the injector 101a. In some embodiments, the hydraulic mechanism 101e is disposed between the flowable mixture supplying unit 103 and the injector 101a.

In some embodiments, a supporting device 105 is configured to facilitate an engagement of the injection unit 101 and the molding device 102. In some embodiments, the supporting device 105 is disposed over the molding device 102. In some embodiments, the supporting device 105 include a first element 101b disposed adjacent to the injector 101a. In some embodiments, the first element 101b is connected to the injection unit 101. The first element 101b is extendable towards the molding device 102 and retractable from the molding device 102. In some embodiments, the first element 101b is vertically extendable/retractable in a second direction as shown by an arrow B. In some embodiments, the first direction and the second direction are in parallel.

In some embodiments, the first element 101b is extendable/retractable along a rail 101f by a motor (not shown) or the like. In some embodiments, the rail 101f is disposed between the flowable mixture supplying unit 103 and the first element 101b. In some embodiments, the injector 101a and the first element 101b are extendable/retractable independent from each other. The injector 101a and the first element 101b can be displaced relative to each other. In some embodiments, the injector 101a and the first element 101b can be displaced separately or consistently. In some embodiments, the first element 101b is in a T shape. In some embodiments, the first element 101b includes a protruding portion 101d engageable with the molding device 102. In some embodiments, the protruding portion 101d of the first element 101b is disposed distal to the flowable mixture supplying unit 103.

In some embodiments, the injection unit 101 is disposed above the molding device 102. In some embodiments, the injector 101a and the first element 101b are disposed above the molding device 102. In some embodiments, the molding device 102 is configured to receive the flowable mixture discharged from the injector 101a through the outlet 101c.

In some embodiments, the molding device 102 includes a first mold 102c and a second mold 102d engageable with the first mold 102c. In some embodiments, the first mold 102c is an upper mold, and the second mold 102d is a lower mold. In some embodiments, the molding device 102 includes a mold cavity (not shown) defined by the first mold 102c and the second mold 102d, and an opening (not shown) in communicable with the mold cavity and correspondingly engageable with the outlet 101c.

Figure 2:
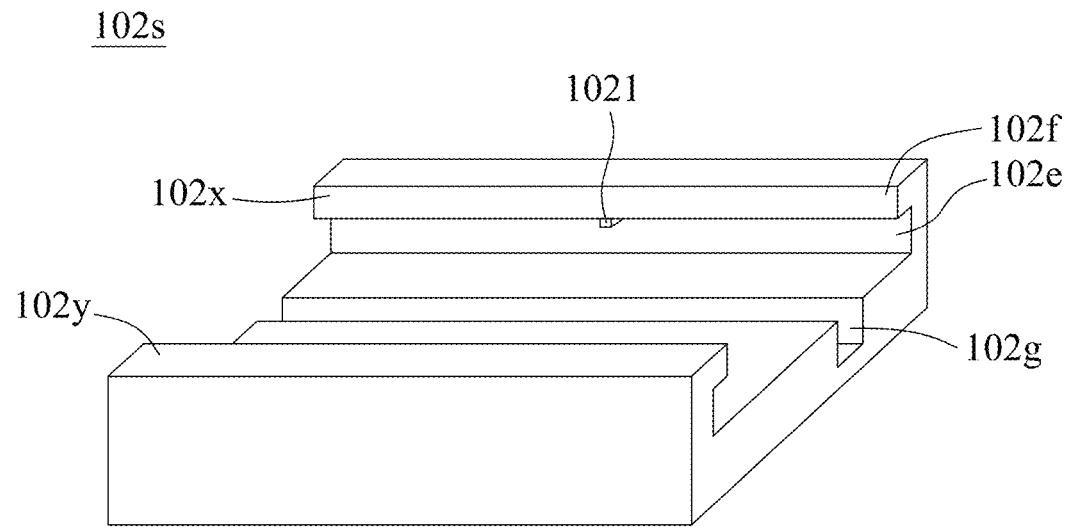
FIG. 2 is a schematic diagram illustrating a portion of an injection molding system in accordance with some embodiments of the present disclosure.
Figure 3:
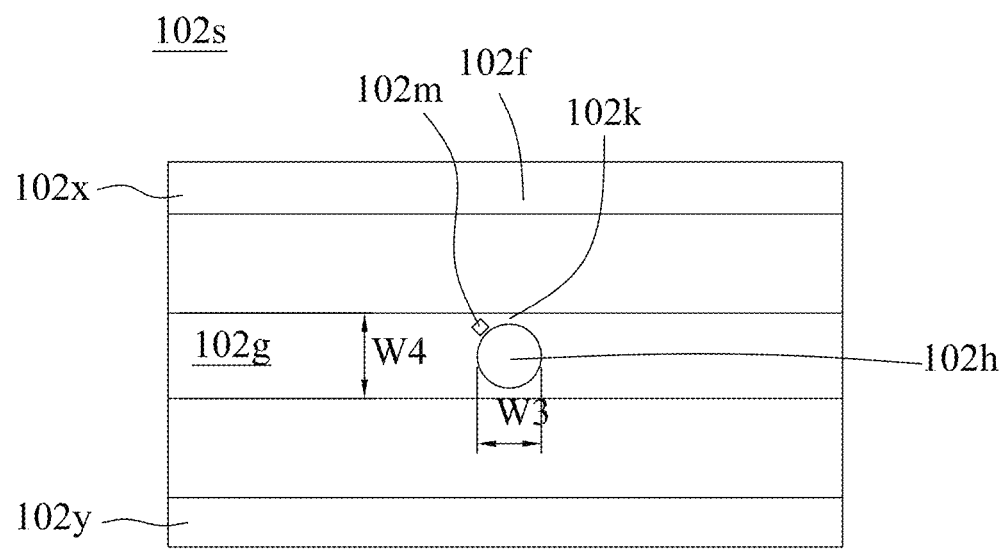
FIG. 3 is a schematic top view illustrating a portion of an injection molding system in accordance with some embodiments of the present disclosure.

FIG. 2 illustrates a schematic perspective view of a second element 102s of the supporting device 105, and FIG. 3 illustrates a schematic top view of the second element 102s. In some embodiments, referring to FIGS. 1 to 3, the supporting device 105 includes the second element 102s disposed on the molding device 102 and engageable with the first element 101b. In some embodiments, the second element 102s is engageable with the molding device 102. In some embodiments, the second element 102s is engageable with the first mold 102c. In some embodiments, the second element 102s is removably attached to the molding device 102. In some embodiments, the second element 102s includes a slot 102e defined by a protrusion 102f.

In some embodiments, the slot 102e and the protrusion 102f are laterally elongated. The slot 102e is configured to receive the protruding portion 101d of the first element 101b of the injection unit 101. The protruding portion 101d of the first element 101b is engageable with the protrusion 102f. In some embodiments, the protruding portion 101d of the first element 101b is slidable within and along the slot 102e of the second element 102s. In some embodiments, a length L1 of the slot 102e equals to a width W1 of the second element 102s. In some embodiments, a height H1 of the slot 102e is greater than a thickness T1 of the protruding portion 101d of the first element 101b. In some embodiments, the protrusion 102f includes a first portion 102x and a second portion 102y, and the protruding portion 101d of the first element 101b is disposed between the first portion 102x and the second portion 102y of the protrusion 102f.

In some embodiments, the second element 102s includes a groove 102g configured to receive the outlet 101e. In some embodiments, the groove 102g is disposed in the second element 102s and laterally elongated along the second element 102s. In some embodiments, the groove 102g is in parallel to the protrusion 102f and the slot 102e. In some embodiments, the groove 102g is disposed between the first portion 102x and the second portion 102y of the protrusion 102f. The groove 102g is configured to receive the outlet 101c or an end portion of the injector 101a of the injection unit 101. The outlet 101c or the end portion of the injector 101a is slidable within and along the groove 102g. In some embodiments, an opening 102h is disposed within the groove 102g. The opening 102h extends through the second element 102s.

In some embodiments, the outlet 101c or the end portion of the injector 101a is receivable by the opening 102h. The outlet 101c or the end portion of the injector 101a is movable within the opening 102h. In some embodiments, a width W3 of the opening 102h is substantially greater than a width W2 of the outlet 101c of the injector 101a. In some embodiments, the width W3 of the opening 102h equals to the width W2 of the outlet 101c of the injector 101a.

In some embodiments, a width W4 of the groove 102g is substantially greater than the width W3 of the opening 102h. In some embodiments, a step 102k is formed within the groove 102g and adjacent to the opening 102h. In some embodiments, the outlet 101c or the end portion of the injector 101a may dispose on the step 102k while the molding device 102 is receiving the flowable mixture. In some embodiments, the width W3 of the opening 102h is substantially less than the width W2 of the outlet 101c of the injector 101a, and the outlet 101c or the end portion of the injector 101a may dispose on the step 102k when the outlet 101c or the end portion of the injector 101a is engaged with the second element 102s. In some embodiments, the outlet 101c covers the opening 102h when the outlet 101c or the end portion of the injector 101a is engaged with the second element 102s.

In some embodiments, a first sensor 102l is disposed within the slot 102e and configured to sense a contact of the protruding portion 101d of the first element 101b and the second element 102s. In some embodiments, the first sensor 102l is disposed at the middle end of the slot 102e. In some embodiments, the first sensor 102l is disposed within the slot 102e and adjacent to the opening 102h. The first sensor 102l is not limited to any particular type, as long as it can sense the pressure and provide pressure information. In some embodiments, a plurality of first sensors 102l are disposed within the slots 102e, and the first sensors 102l are configured to sense a position and the contact of the protruding portion 101d and the slot 102e. The number and location of the plurality of first sensors 102l are not particularly limited; for example, they can be arranged at anywhere of the protrusion 102f and within the slot 102e; however, the present invention is not limited thereto.

In some embodiments, a second sensor 102m is disposed within the groove 102g and configured to sense a contact of the outlet 101c and the molding device 102. In some embodiments, a second sensor 102m is disposed within the groove 102g and adjacent to the opening 102h. The second sensor 102m is not limited to any particular type, as long as it can sense the pressure and provide pressure information. In some embodiments, a plurality of second sensors 102m are disposed within the groove 102g, and the second sensors 102m are configured to sense a position and the contact of the outlet 101c and the groove 102g. The number and location of the plurality of second sensors 102m are not particularly limited; for example, they can be arranged at anywhere of the groove 102g; however, the present invention is not limited thereto.

Figure 4:
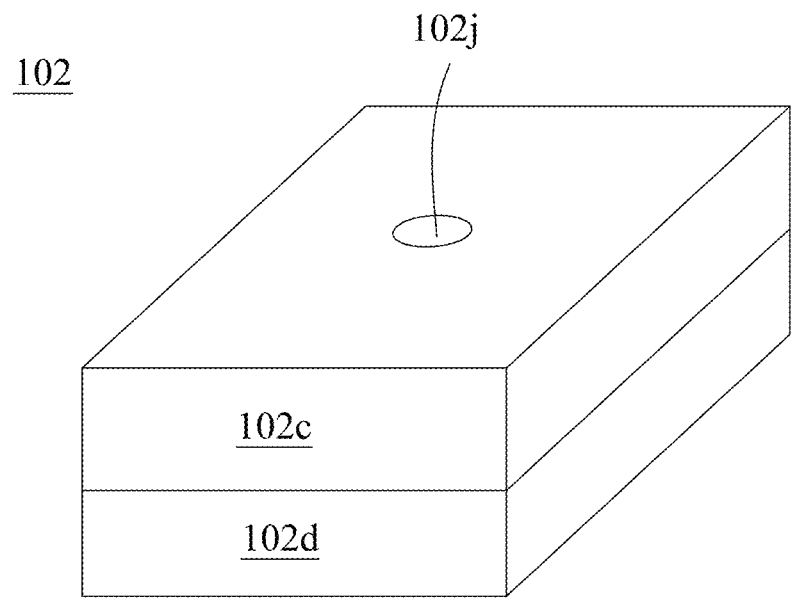
FIG. 4 is a schematic diagram illustrating a portion of an injection molding system in accordance with some embodiments of the present disclosure.

In some embodiments, the molding device 102 can be in an open state and a closed state. The first mold 102c is engaged with the second mold 102d when the molding device 102 is in the closed state. FIG. 4 illustrates a schematic perspective view of the molding device 102 in a closed state, and FIG. 5 illustrates a schematic cross-sectional view of the molding device 102 in the closed state.

Figure 5:
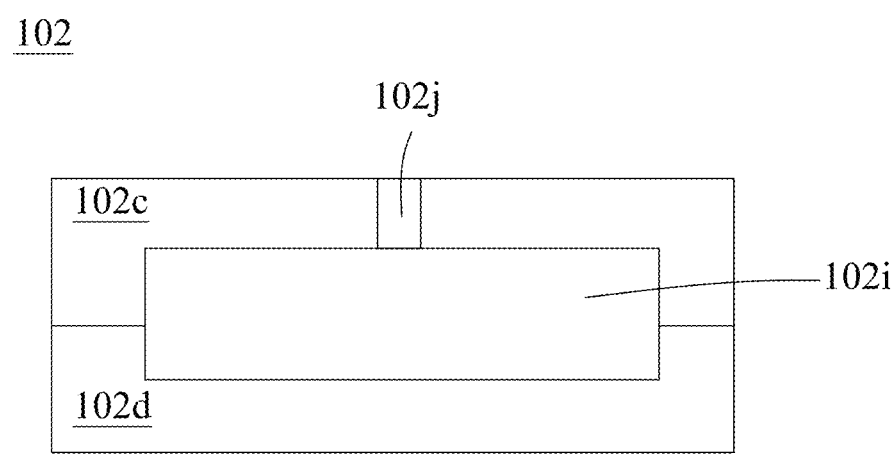
FIG. 5 is a schematic cross-sectional view illustrating a portion of an injection molding system in accordance with some embodiments of the present disclosure.

In some embodiments, referring to FIGS. 4 and 5, a mold cavity 102i is defined by the first mold 120c and the second mold 102d when the molding device 102 is in the closed state. In some embodiments, the mold cavity 102i is configured to receive the flowable mixture from the injector 101a through the opening 102h of the second element 102s. The mold cavity 102i is accessible only through a feeding port 102j when the molding device 102 is in the closed state. The mold cavity 102i is accessible through a gap (not shown) between the first mold 102c and the second mold 102d when the molding device 102 is in the open state. In some embodiments, the molding device 102 includes the feeding port 102j communicable with the mold cavity 102i. In some embodiments, the feeding port 102j is disposed at and penetrates through the first mold 102c. In some embodiments, the opening 102h is aligned with the feeding port 102j when the second element 102s is disposed over the molding device 102, so that the flowable mixture can flow from the injector 101a into the mold cavity 102i through the opening 102h and the feeding port 102j. In some embodiments, the opening 102h is overlapped with the feeding port 102j when the second element 102s is disposed over the molding device 102 from a top view.

In some embodiments, the molding device 102 is disposed on a carrier (not shown) and may be moved together with the carrier. In some embodiments, a plurality of molding devices 102 are disposed on the carrier, and the molding devices 102 are arranged in a line, a row, a column, an arc, a curve or any other suitable arrangements. In some embodiments, the carrier is rotatable.

In some embodiments, referring back to FIGS. 1, 2 and 3, the supporting device 105 further includes a third element 101g connected to the injection unit 101, and the second element 102s is configured to receive the first element 101b and the third element 101g. In some embodiments, the first element 101b and the third element 101g are both configured to receive by the first portion 102x and the second portion 102y of the protrusion 102f.

In some embodiments, the third element 101g is disposed adjacent to the injector 101a. In some embodiments, the third element 101g is connected to the injection unit 101. In some embodiments, the injector 101a is disposed between the first element 101b and the third element 101g. The third element 101g is engageable with the second element 102s. The third element 101g is extendable towards the second element 102s and retractable from the second element 102s. In some embodiments, the third element 101g is vertically extendable/retractable in the second direction as shown by the arrow B.

In some embodiments, the third element 101g is extendable/retractable along the rail 101f by a motor (not shown) or the like. In some embodiments, the rail 101f is disposed between the flowable mixture supplying unit 103 and the third element 101g. In some embodiments, the third element 101g and the first element 101b are extendable/retractable independent from each other. The third element 101g and the first element 101b can be displaced relative to each other. In some embodiments, the third element 101g and the injector 101a are extendable/retractable independent from each other. The third element 101g and the injector 101a can be displaced relative to each other. In some embodiments, the third element 101g and the first element 101b can be displaced separately or consistently. In some embodiments, the third element 101g is in a T shape. In some embodiments, the third element 101g includes a protruding portion 101h engageable with the second element 102s. In some embodiments, the protruding portion 101h is engageable with the slot 102e. In some embodiments, the protruding portion 101h of the third element 101g is disposed distal to the flowable mixture supplying unit 103. In some embodiments, a configuration of the third element 101g is similar to or different from a configuration of the first element 101b.

Figure 6:
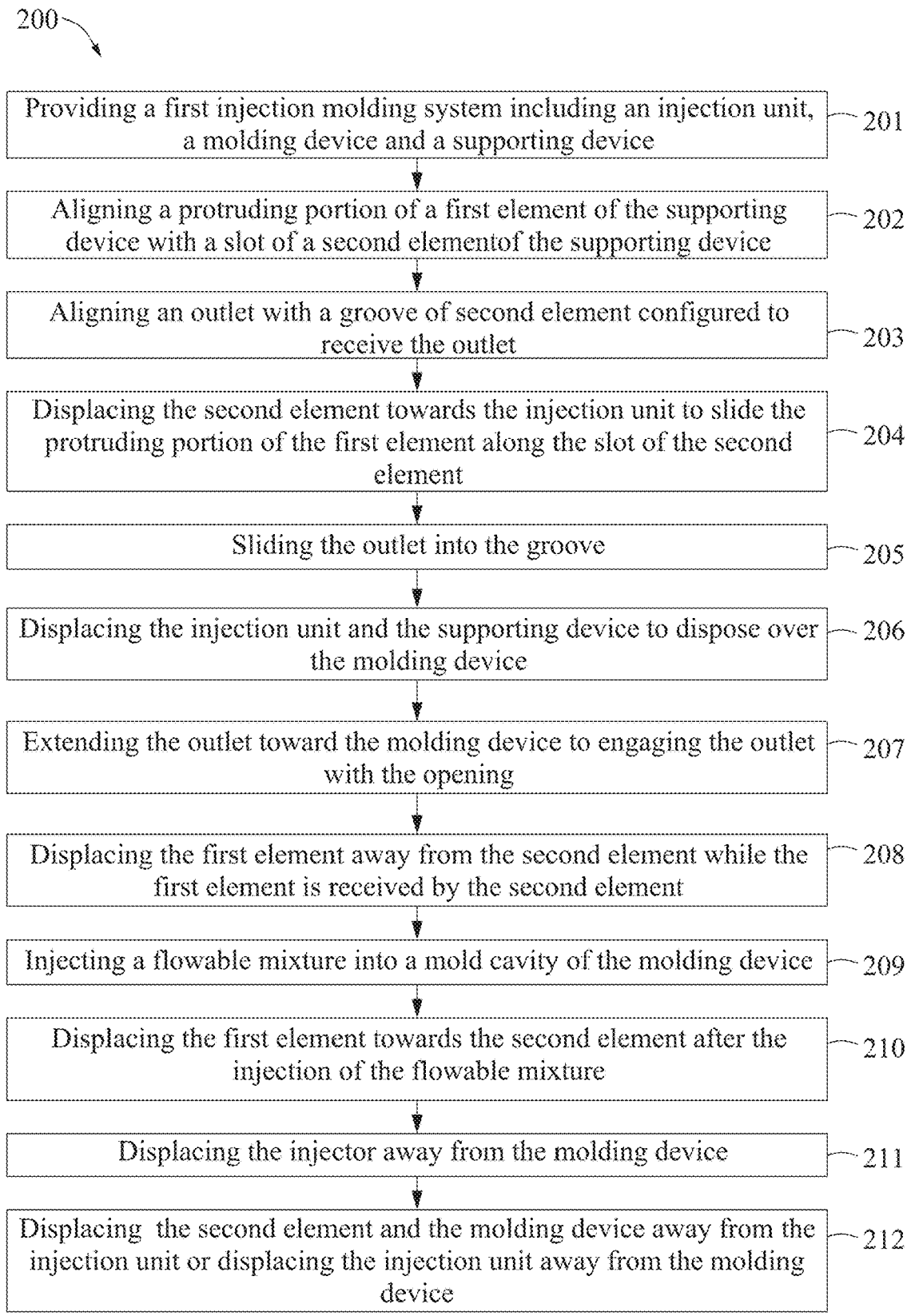
FIG. 6 is a flowchart illustrating an injection molding method in accordance with some embodiments of the present disclosure.

In the present disclosure, a first injection molding method 200 is also disclosed. The first injection molding method 200 includes a number of operations, and the description and illustrations are not deemed as a limitation of the sequence of the operations. FIG. 6 is an embodiment of the first injection molding method 200. In some embodiments, the first injection molding method 200 includes a number of operations (201 to 212). FIGS. 7-18 are schematic cross-sectional views of various stages of the first injection molding method in accordance with some embodiments of the present disclosure. In some embodiments, the first injection molding method 200 is implemented by the first injection molding system 100 as illustrated in FIGS. 1-5 and discussed above.

Figure 7:
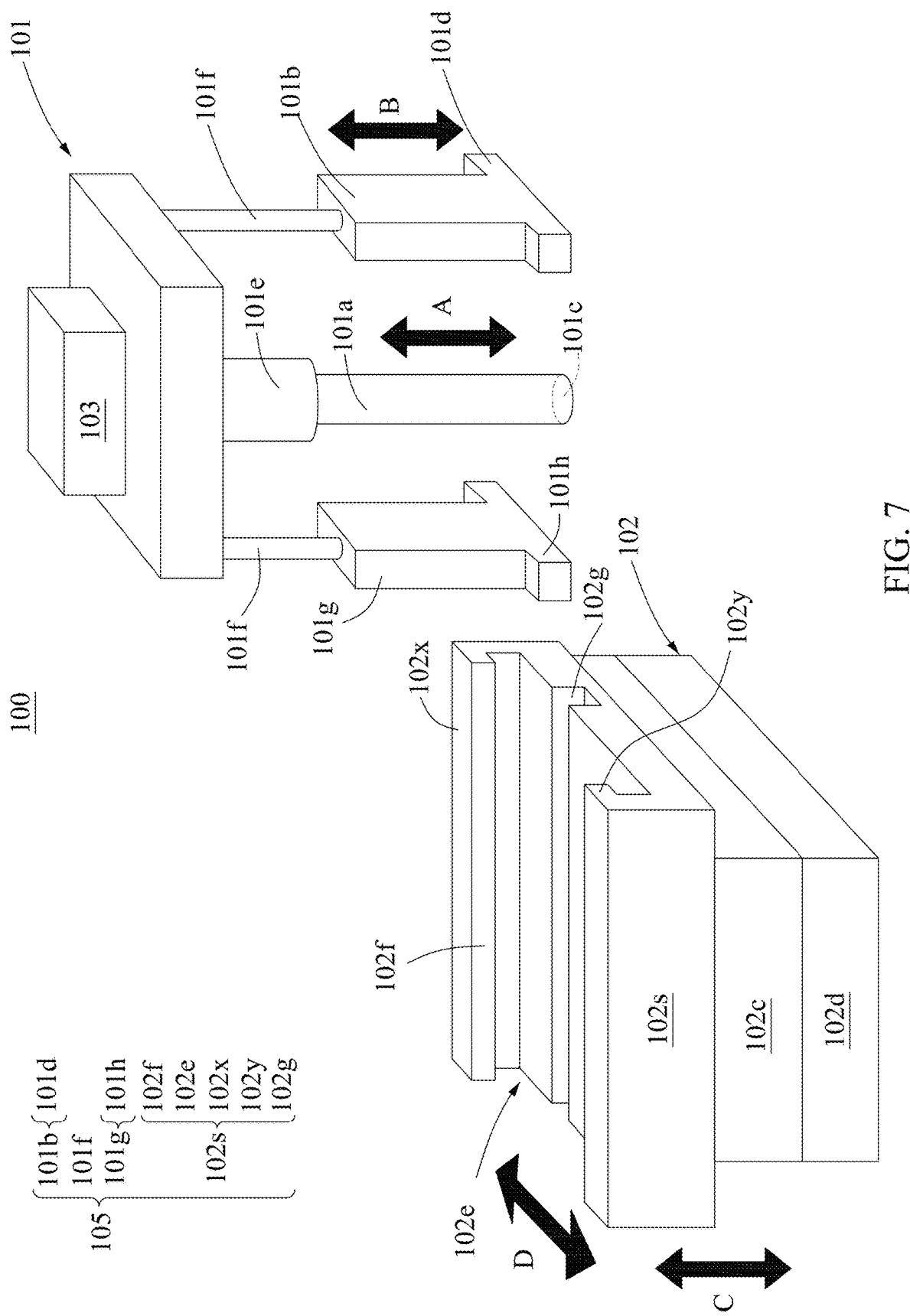
FIGS. 7 to 18 are side views or schematic cross-sectional views of an injection molding system at one or more manufacturing stages of an injection molding method in accordance with some embodiments of the present disclosure.

In operation 201, referring to FIG. 7, a first injection molding system 100 including an injection unit 101, a molding device 102 and a supporting device 105 is provided. In some embodiments, the first injection molding system 100 includes the injection unit 101, the molding device 102 and the supporting device 105 as discussed above. The molding device 102 is in the closed state. The opening 102h of the second element 102s is aligned with a feeding port 102j of the molding device 102, so that the mold cavity 102i is accessible through the opening 102h and the feeding port 102j. In some embodiments, the molding device 102 is disposed on a carrier (not shown) and may be moved together with the carrier. In some embodiments, several molding devices 102 are disposed on the carrier.

In operation 202, a protruding portion 101d of a first element 101b of the supporting device 105 is aligned with a slot 102e of the second element 102s of the supporting device 105. In operation 203, an outlet 101c is aligned with a groove 102g of the second element 102s configured to receive the outlet 101c. In some embodiments, the alignment of the protruding portion 101d of the first element 101b with the slot 102e of the second element 102s and the alignment of the outlet 101c with the groove 102g are performed simultaneously. In some embodiments, the molding device 102 is disposed under the second element 102s during the alignment of the protruding portion 101d of the first element 101b with the slot 102e of the second element 102s.

In some embodiments, the injector 101a and the first element 101b are vertically displaced along the arrow A and the arrow B respectively in order to horizontally align with the groove 102g and the slot 102e respectively as shown in FIG. 7. In some embodiments, the injector 101a moves upward or downward in order to horizontally align the outlet 101c with the groove 102g. In some embodiments, the first element 101b moves upward or downward in order to horizontally align the protruding portion 101d with the slot 102e. Alternatively or simultaneously, the second element 102s is displaced along the arrow C and/or the arrow D in order to horizontally align with the protruding portion 101d of the first element 101b and the outlet 101c or the end portion of the injector 101a. In some embodiments, the second element 102s is moved upward, downward, forward or backward in order to horizontally align the slot 102e with the protruding portion 101d and horizontally align the groove 102g with the outlet 101c or the end portion of the injector 101a.

In some embodiments, a protruding portion 101h of a third element 101g is aligned with the slot 102e of the second element 102s. In some embodiments, the process of aligning the protruding portion 101h of the third element 101g with the slot 102e of the second element 102s is similar to the process of aligning the protruding portion 101d of the first element 101b with the slot 102e of the second element 102s, and repeated description is omitted for a sake of brevity. In some embodiments, the alignment of the protruding portion 101d of the first element 101b with the slot 102e of the second element 102s and the alignment of the protruding portion 101h of the third element 101g with the slot 102e are performed simultaneously.

Figure 8:
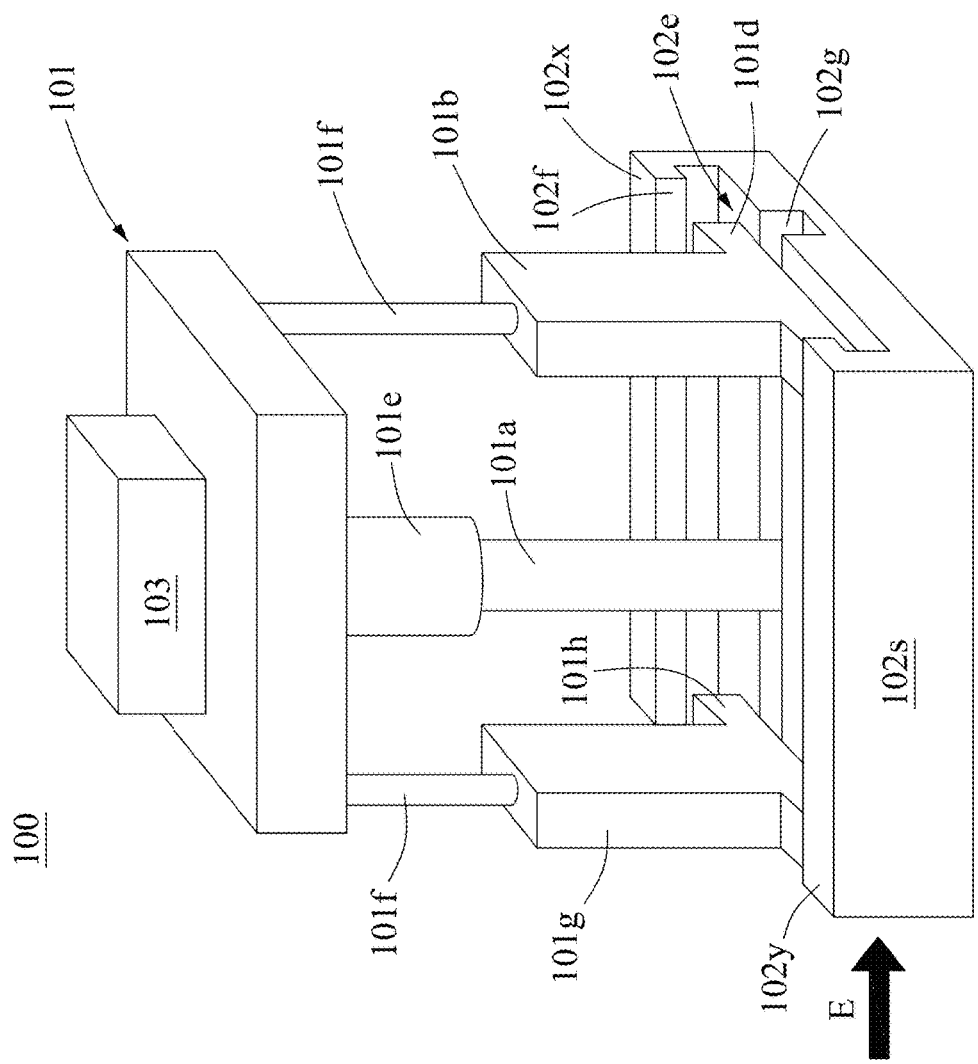
Figure 8:
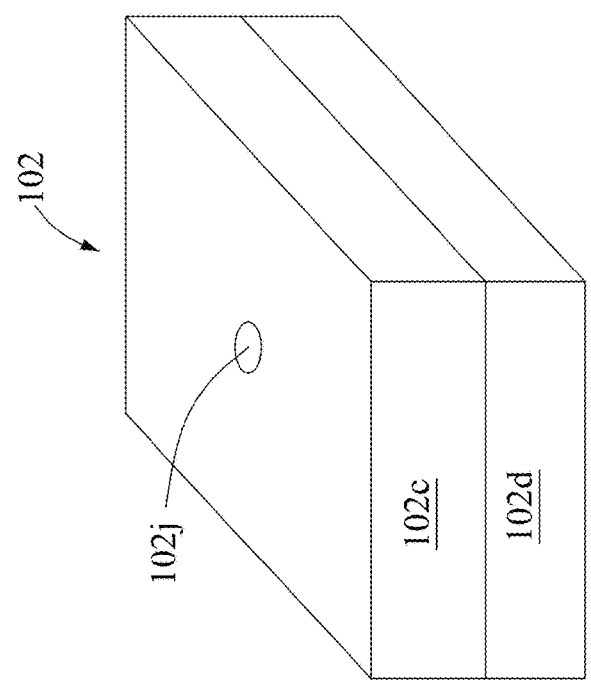
Figure 9:
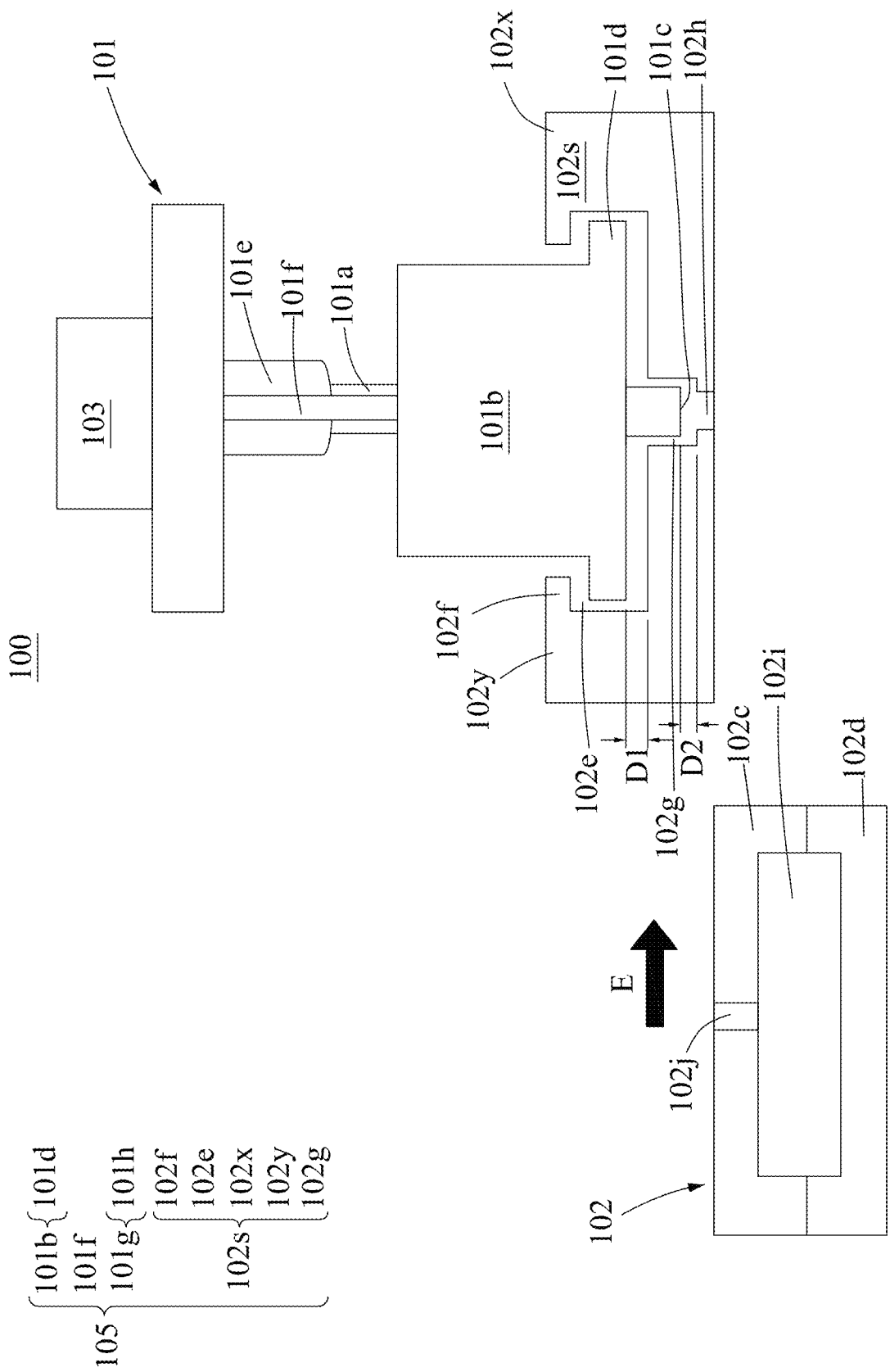

In operation 204, referring to FIGS. 8 and 9, the second element 102s is displaced toward the injection unit 101 to slide the protruding portion 101d of the first element 101b along the slot 102e of the second element 102s. In operation 205, the outlet 101c is slide into the groove 102g.

In some embodiments, after the horizontal alignment, the second element 102s is moved towards the injection unit 101 along an arrow E as shown in FIG. 8. Alternatively, after the horizontal alignment, the injection unit 101 is moved towards the second element 102s along an arrow L as shown in FIG. 8. In some embodiments, the molding device 102 is moved towards the second element 102s and the injection unit 101 after the horizontal alignment of the second element 102s and the injection unit 101. In other words, the molding device 102 is movable while the injection unit 101 and the second element 102s are fixed relative to the molding device 102.

FIG. 9 is a schematic cross-sectional view of the first injection molding system 100 of FIG. 8. In some embodiments, the protruding portion 101d of the first element 101b slides along the slot 102e, and the outlet 101c or the end portion of the injector 101a slides along the groove 102g. In some embodiments, the protruding portion 101h of the third element 101g slides along the slot 102e. As shown in FIG. 9, the protrusion 102f is disposed opposite to the protruding portion 101d of the first element 101b. In some embodiments, the protruding portion 101d of the first element 101b and the protruding portion 101h of the third element 101g are disposed between a first portion 102x and a second portion 102y of the protrusion 102f.

In some embodiments, in operation 204 and operation 205, the first element 101b, the third element 101g and the injector 101a are not in contact with the second element 102s. In some embodiments, the outlet 101c or the end portion of the injector 101a is surrounded by the groove 102g and does not in contact with a step 102k within the groove 102g. In some embodiments, a first distance D1 between a bottom surface of the protruding portion 101d and the second element 102s is substantially greater than a second distance D2 between the outlet 101c and a bottom surface of the groove 102g.

Figure 10:
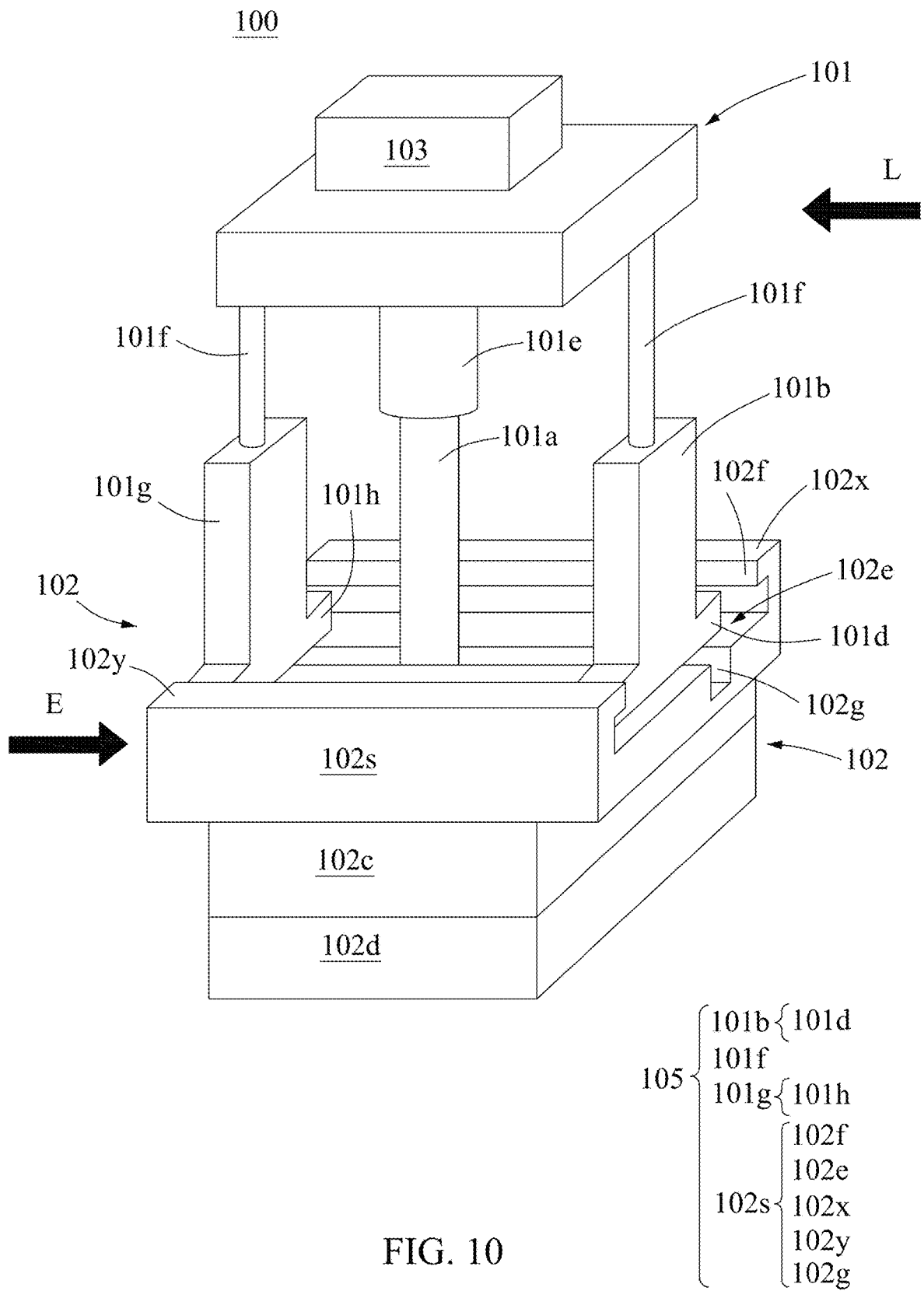

In operation 206, the injection unit 101 and the supporting device 105 are displaced to dispose over the molding device 102. In some embodiments, referring to FIG. 10, after the alignment of the injector 101a with the opening 102h and the injector 101a, the first element 101b moves towards the molding device 102 along an arrow F as shown in FIG. 10. In some embodiments, the molding device 102 is moved until the supporting device 105 overlaps the molding device 102 and the injector 101a vertically aligns with a feeding port 102j of the molding device 102. In some embodiments, the molding device 102 is moved by rotating the carrier (not shown) carrying the molding device 102.

Figure 11:
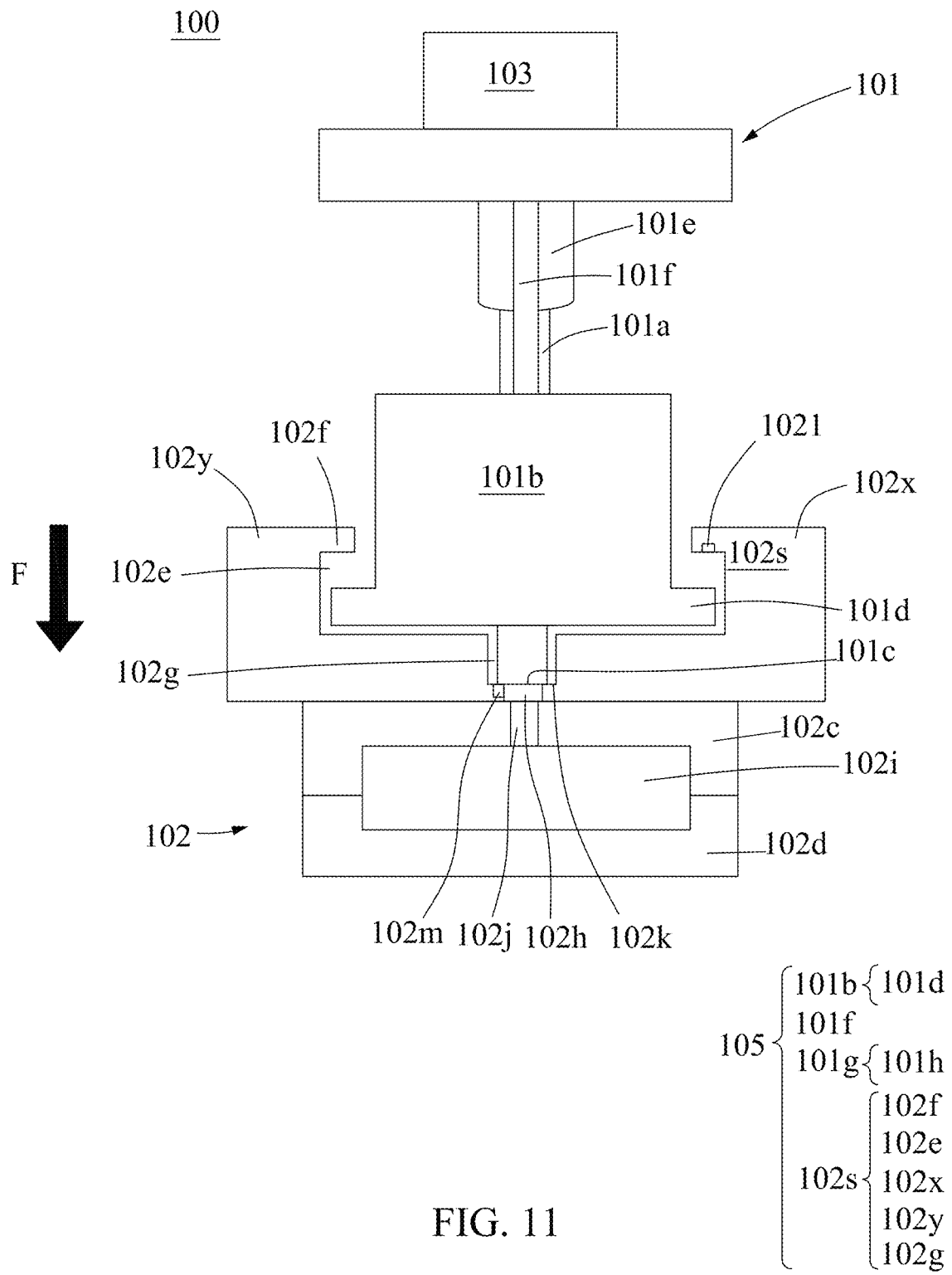

In operation 207, referring to FIG. 11, the outlet 101c is extended toward the molding device 102 to engaging the outlet 101c with the opening 102h.

In some embodiments, after the alignment of the injector 101a with the opening 102h, the injector 101a and the first element 101b move towards the molding device 102 along an arrow F as shown in FIG. 11, until the outlet 101c of the injector 101a contacts the second element 102s. In some embodiments, the outlet 101c is engaged with the opening 102h and in contact with the step 102k. In some embodiments, the injector 101a and the first element 101b are moved consistently. When the outlet 101c of the injector 101a contacts the second element 102s, the entire first element 101b is still not in contact with the second element 102s, as shown in FIG. 11. In some embodiments, the third element 101g (not shown in FIG. 11) and the first element 101b are moved consistently in operation 207. In some embodiments, a contact of the second element 102s and the outlet 101c is sensed by a second sensor 102m disposed within the groove 102g. In some embodiments, the contact of the second element 102s and the outlet 101c is sensed continuously.

Figure 12:
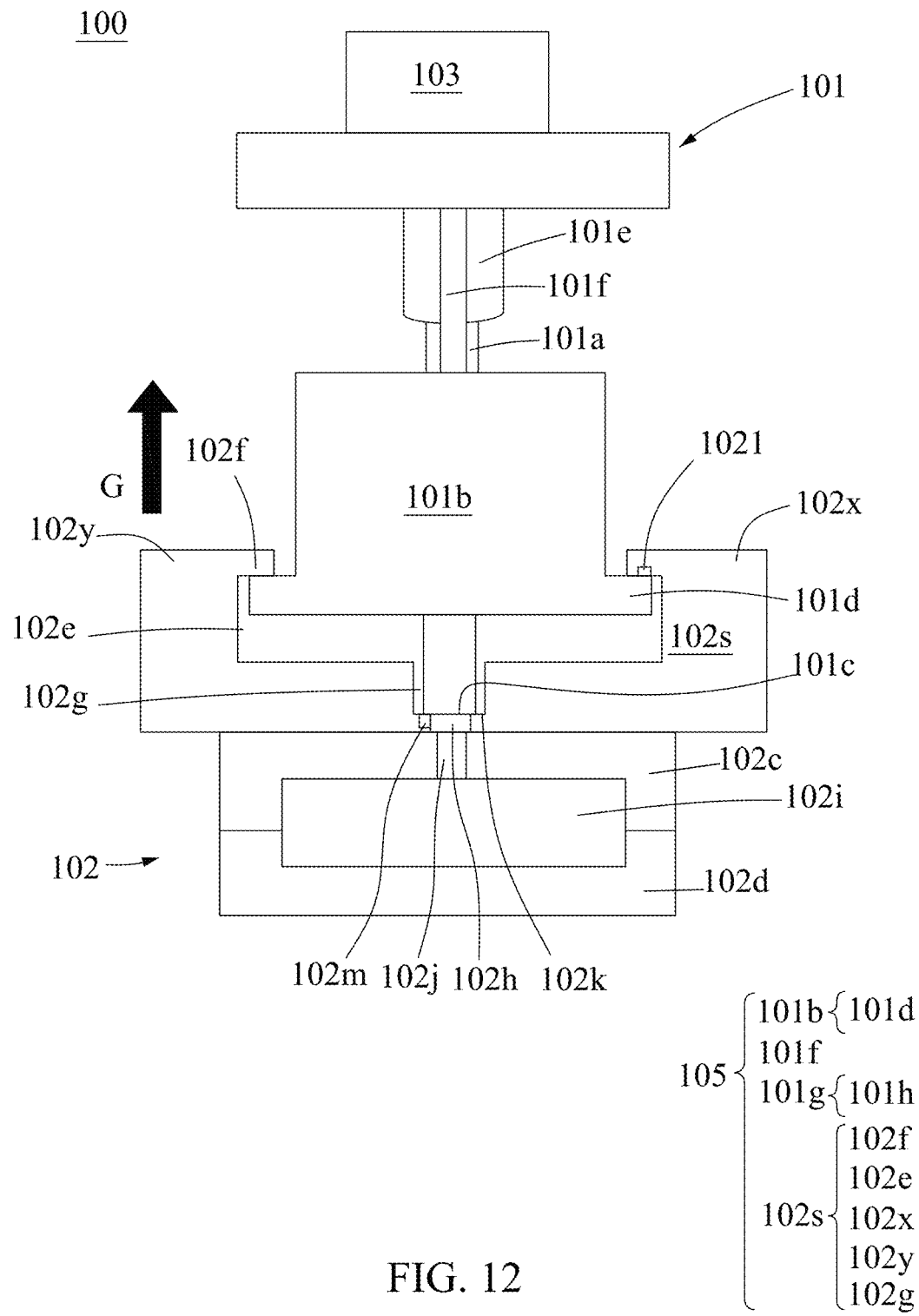

In operation 208, referring to FIG. 12, the first element 101b is displaced away from the second element 102s while the first element 101b is received by the second element 102s. In some embodiments, the protruding portion 101d of the first element 101b is moved to abut against the protrusion 102f of the second element 102s while the protruding portion 101d of the first element 101b is received by the slot 102e of the second element 102s.

In some embodiments, after the contact of the outlet 101c with the second element 102s, the first element 101b moves away from the second element 102s along an arrow G as shown in FIG. 12, until the protruding portion 101d of the first element 101b contacts the protrusion 102f of the second element 102s. In some embodiments, the injector 101a remains stationary when the first element 101b is moving upward as shown in FIG. 12. As a result, the first element 101b is engaged with the second element 102s. In some embodiments, a contact of the second element 102s and the first element 101b is sensed by a first sensor 102l disposed on the protrusion 102f and within the slot 102e. In some embodiments, the contact of the second element 102s and the first element 101b is sensed by the first sensor 102l. In some embodiments, the contact of the protrusion 102f and the protruding portion 101d of the first element 101b is sensed by the first sensor 102l. In some embodiments, the contact of the second element 102s and the first element 101b is sensed continuously.

In some embodiments, the third element 101g (not shown in FIG. 12, shown in FIG. 8) and the first element 101b are moved consistently in operation 208. In some embodiments, the protruding portion 101h (not shown in FIG. 12, shown in FIG. 8) of the third element 101g is moved to abut against the protrusion 102f of the second element 102s while the protruding portion 101h of the third element 101g is received by the slot 102e of the second element 102s. In some embodiments, the contact of the protruding portion 101h of the third element 101g and the protrusion 102f of the second element 102s is sensed by the first sensor 102l.

Figure 13:
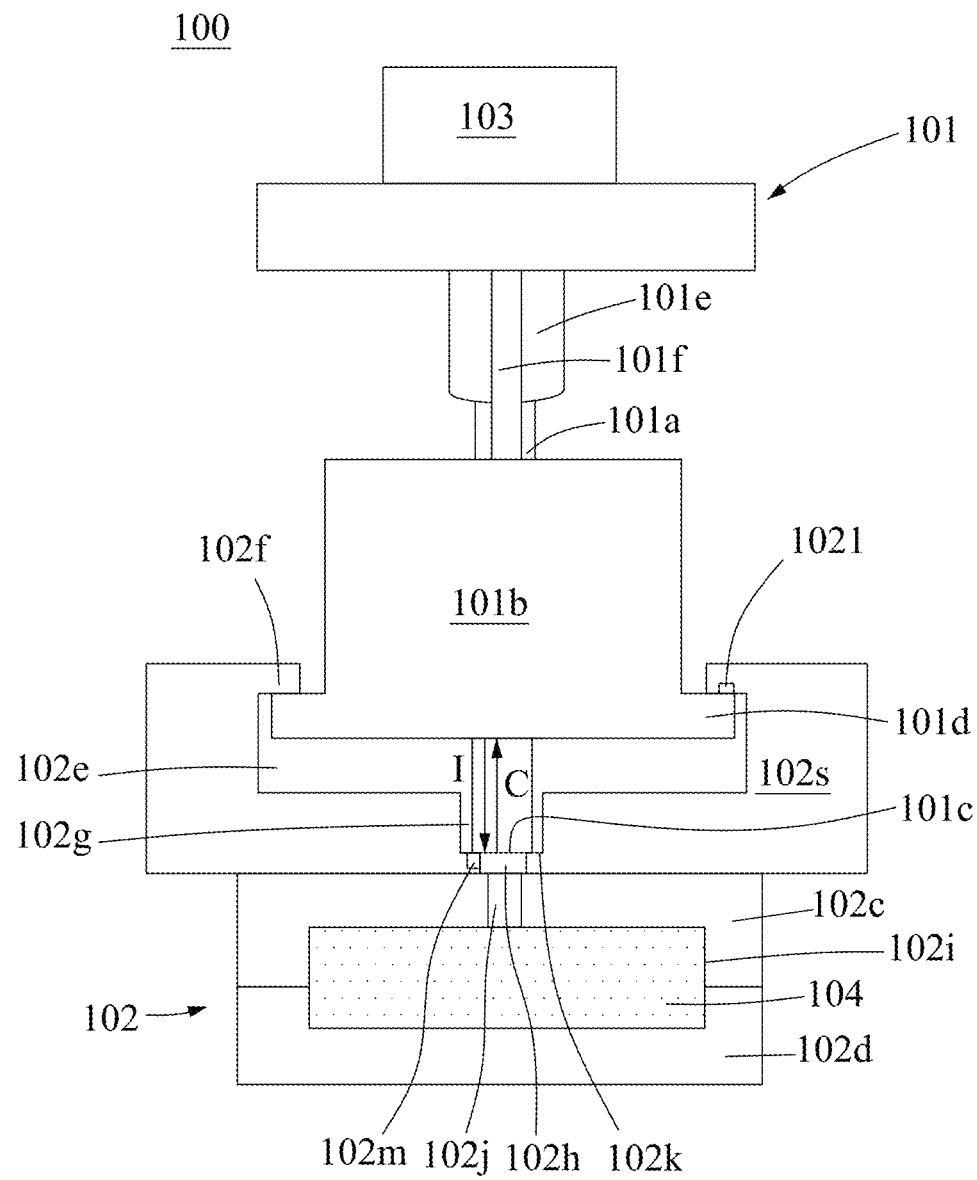

In operation 209, referring to FIG. 13, a flowable mixture 104 is injected into a mold cavity 102i of the molding device 102.

In some embodiments, after the contact of the protruding portion 101d with the protrusion 102f, the flowable mixture 104 is injected into the mold cavity 102i as shown in FIG. 13. The flowable mixture 104 is discharged from the outlet 101c of the injector 101a into the mold cavity 102i through the opening 102h and the feeding port 102j of the molding device 102. In some embodiments, the flowable mixture 104 is supplied by the flowable mixture supplying unit 103 connected to the injector 101a. In some embodiments, a composition of the flowable mixture 104 is similar to the flowable mixture prepared by the supplying unit 103 as discussed above, and repeated description is omitted for a sake of brevity.

In some embodiments, during the injection of the flowable mixture 104, the outlet 101c is engaged with the opening 102h and in contact with the step 102k, and the protruding portion 101d of the first element 101b is abutted against the protrusion 102f of the second element 102s. During the injection of the flowable mixture 104 into the mold cavity 102i by the injector 101a, an injection force I is generated towards the second element 102s and/or the molding device 102. In some embodiments, the injection force I acts on the second element 102s and/or the molding device 102 to push the second element 102s and/or the molding device 102 away from the injection unit 101, and as a result a counter force C acting on the protruding portion 101d by the protrusion 102f is generated. The protruding portion 101d abuts against the protrusion 102f during the injection of the flowable mixture 104. Therefore, an engagement of the first element 101b and the second element 102s as well as an engagement of the outlet 101c and the feeding port 102j are secured. The flowable mixture 104 flowing out of the mold cavity 102i can be minimized or even prevented.

Figure 14:
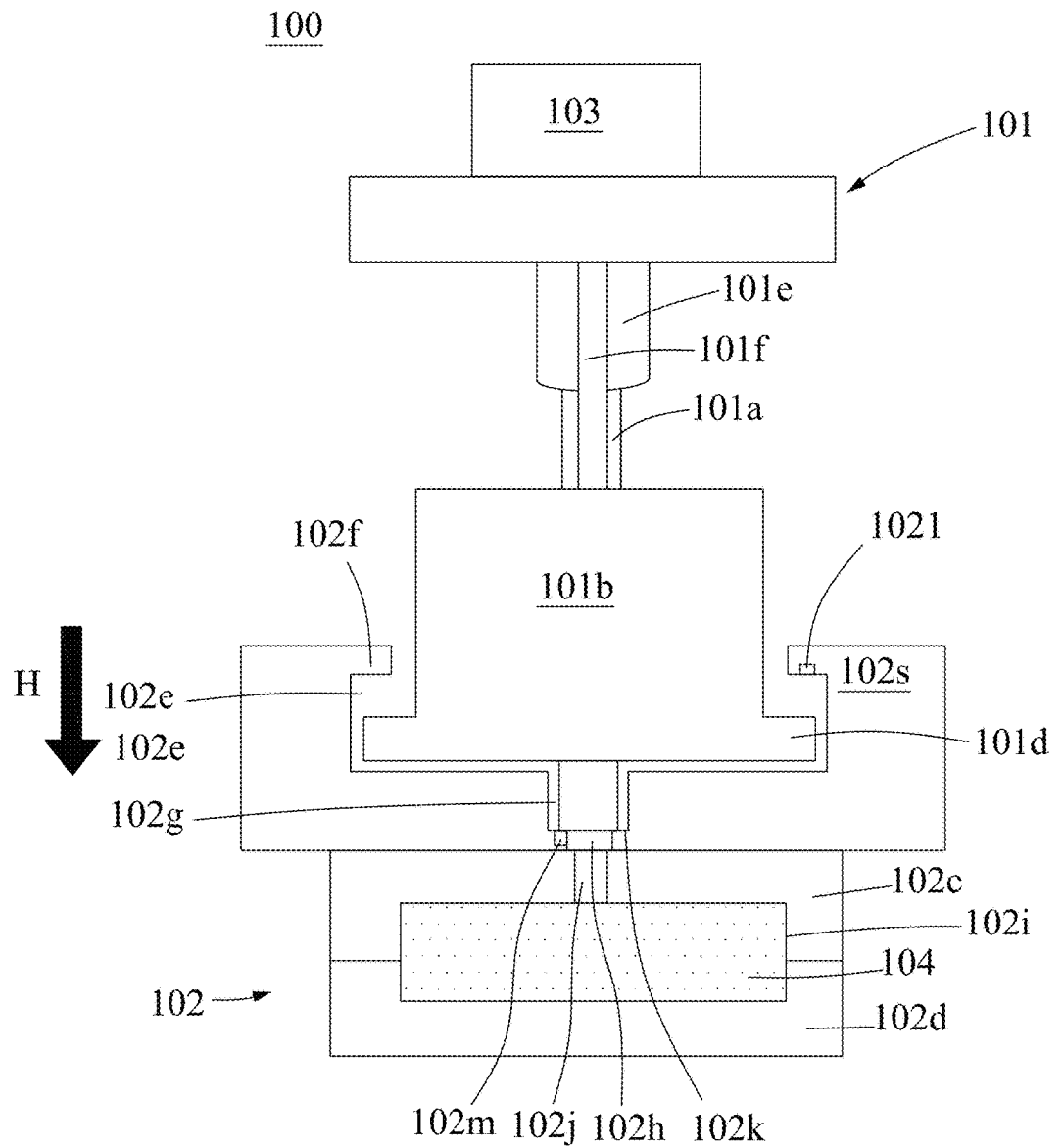

In operation 210, referring to FIG. 14, the first element 101b is displaced towards the second element 102s after the injection of the flowable mixture 104. In some embodiments, the protruding portion 101d of the first element 101b is disengaged from the protrusion 102f of the second element 102s after the injection of the flowable mixture 104 while the protruding portion 101d of the first element 101b is received by the slot 102e of the second element 102s.

In some embodiments, after the injection of the flowable mixture 104, the first element 101b is displaced towards the second element 102s along an arrow H as shown in FIG. 14, until the first element 101b is disengaged from the second element 102s. In some embodiments, the protruding portion 101d is moved away from the protrusion 102f. In some embodiments, the first element 101b is moved toward the molding device 102 to disengaged from the protrusion 102f. In some embodiments, the injector 101a remains stationary when the first element 101b is moving downward as shown in FIG. 14. In some embodiments, a separation of the protrusion 102f and the protruding portion 101d of the first element 101b is sensed by the first sensor 102l.

In some embodiments, the third element 101g (not shown in FIG. 14, shown in FIG. 8) and the first element 101b are moved consistently in operation 210. In some embodiments, the protruding portion 101h (not shown in FIG. 14, shown in FIG. 8) of the third element 101g is displaced towards the second element 102s after the injection of the flowable mixture 104. In some embodiments, a separation of the protruding portion 101h of the third element 101g and the protrusion 102f of the second element 102s is sensed by the first sensor 102l.

Figure 15:
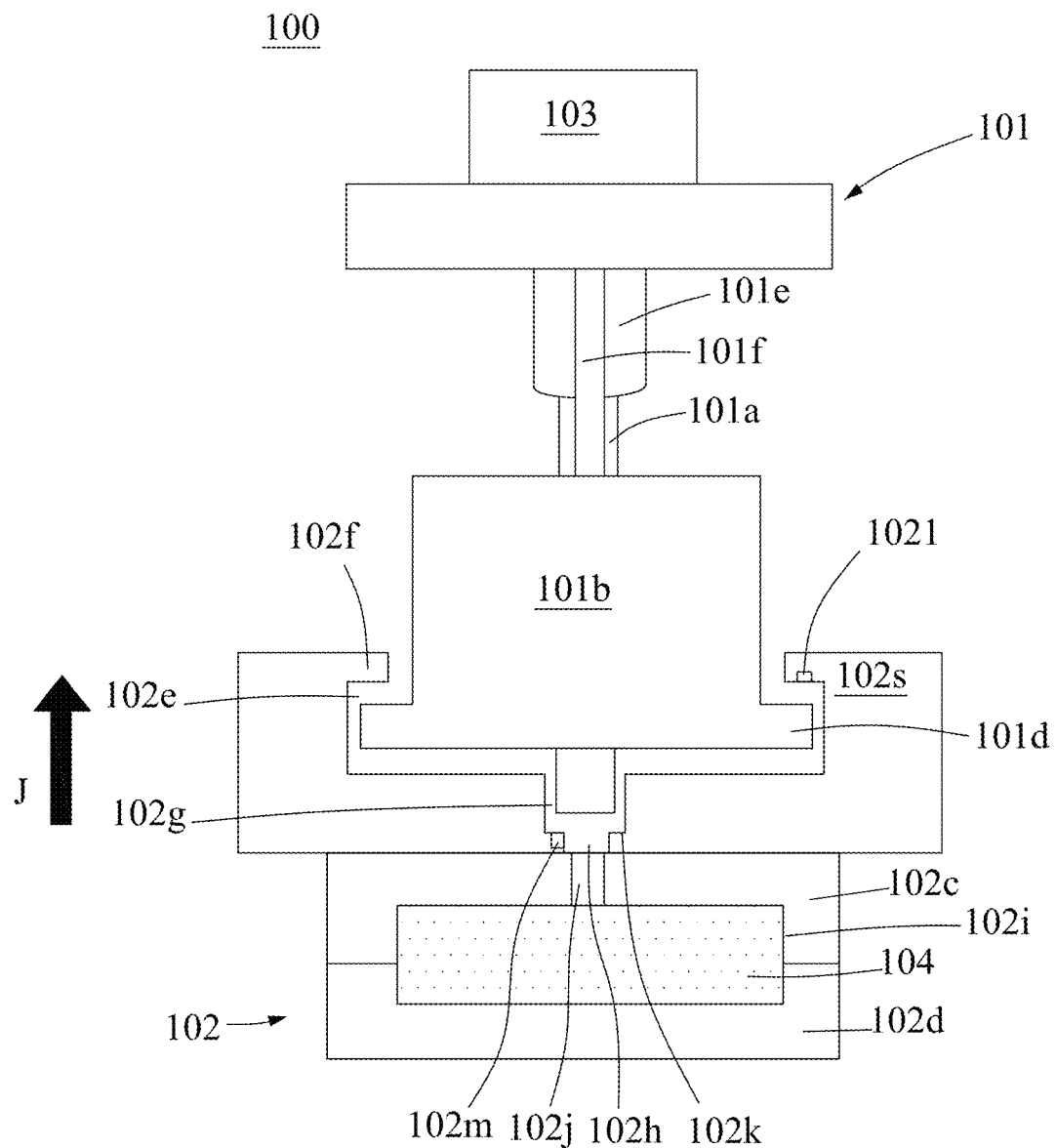

In operation 211, referring to FIG. 15, the injector 101a is displaced away from the molding device 102. In some embodiments, the outlet 101c is retracted away from the molding device 102 after the injection of the flowable mixture 104.

In some embodiments, after the disengagement of the first element 101b from the second element 102s, the injector 101a moves away from the molding device 102 along an arrow J as shown in FIG. 15, until the outlet 101c of the injector 101a is not in contact with the second element 102s. In some embodiments, a separation of the injector 101a and the groove 102g is sensed by the second sensor 102m. In some embodiments, the injector 101a and the first element 101b move away from the molding device 102 along the arrow J. In some embodiments, the injector 101a and the first element 101b are moved consistently. In some embodiments, the injector 101a, the first element 101b and the third element 101g are moved consistently.

Figure 16:
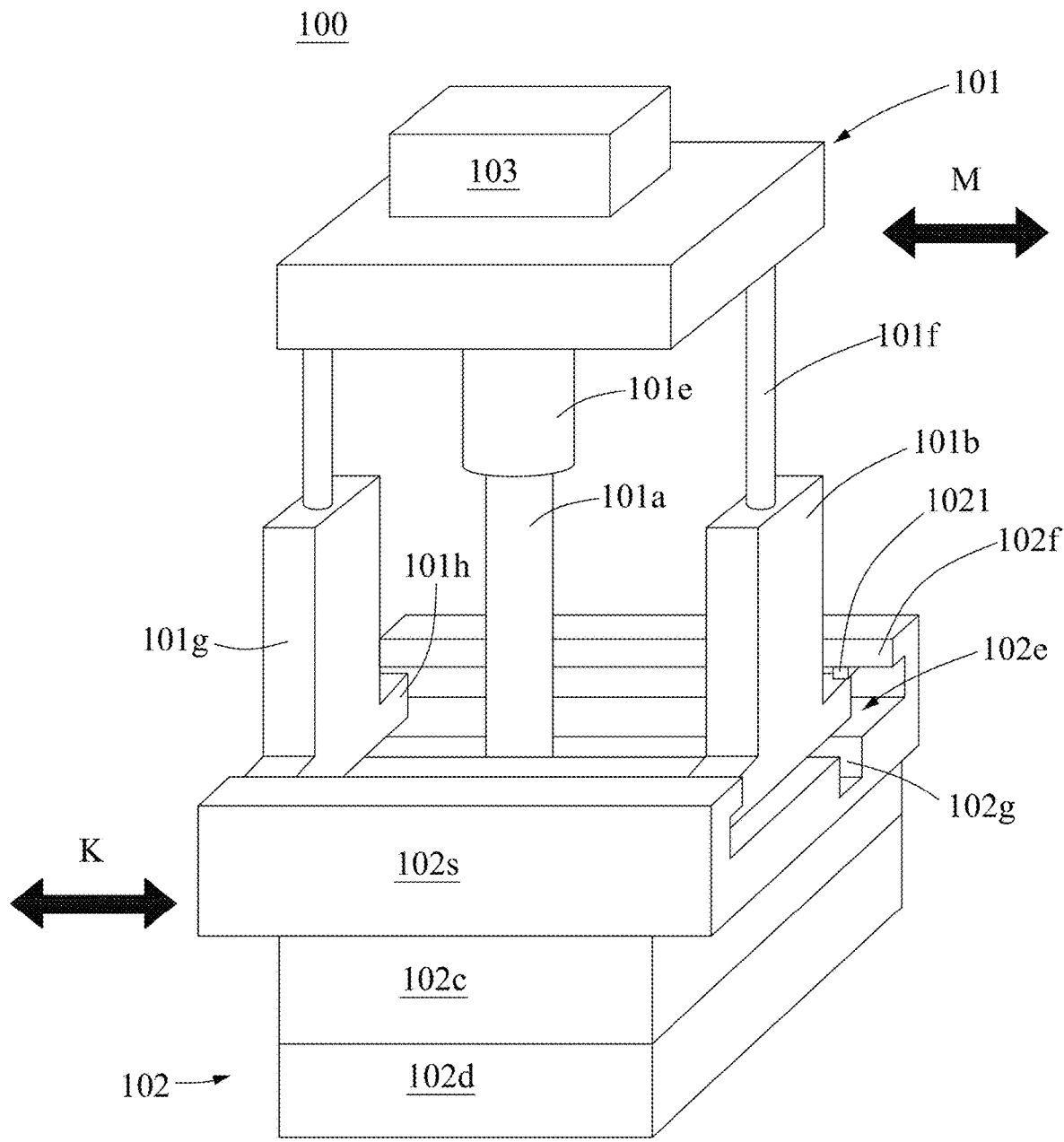
Figure 17:
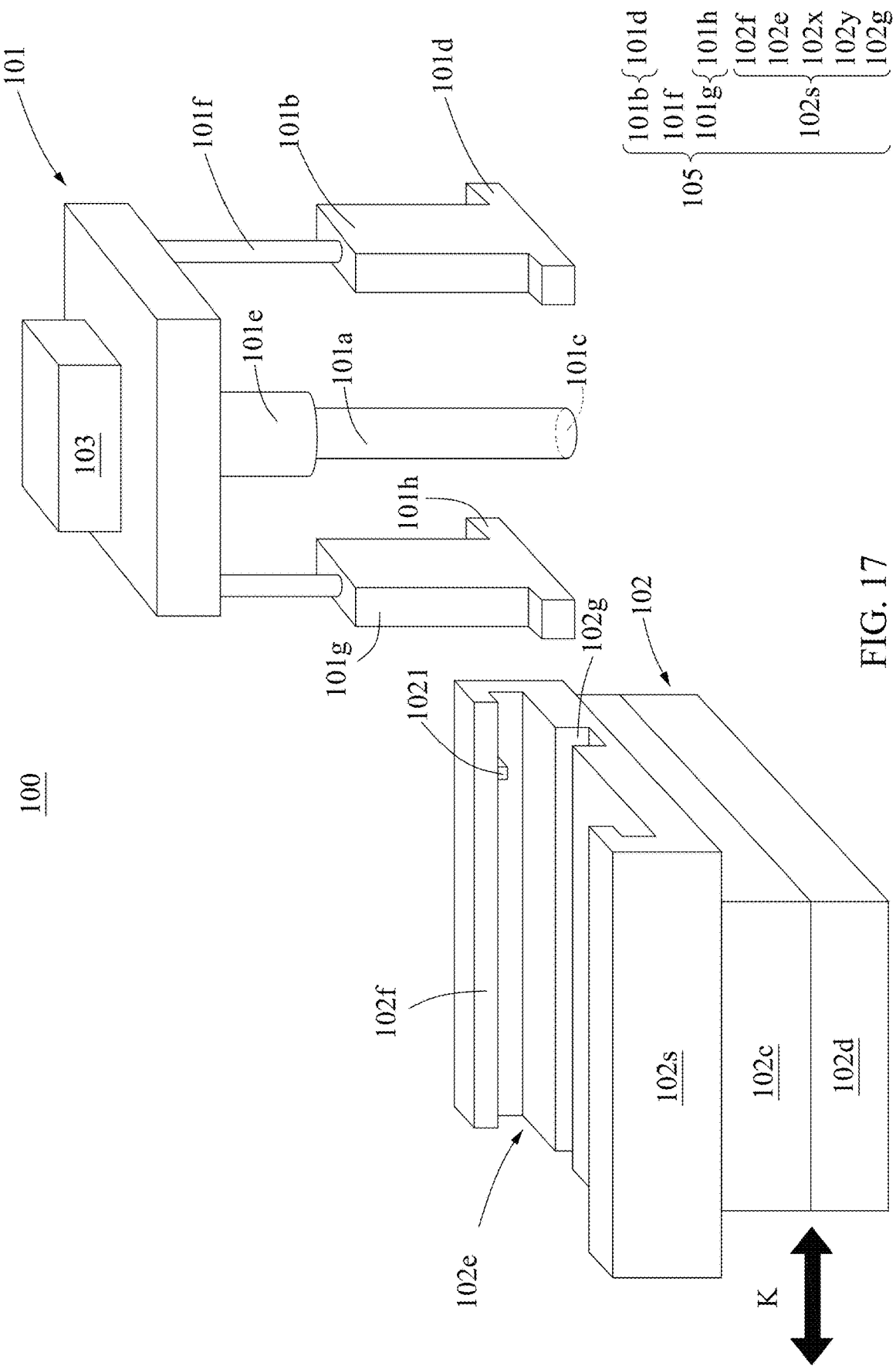

In operation 212, referring to FIGS. 16 and 17, the second element 102s and the molding device 102 are displaced away from the injection unit 101 or displacing the injection unit 101 away from the molding device 102.

In some embodiments, after the disengagement of the first element 101b and the injector 101a from the second element 102s, the second element 102s and the molding device 102 are displaced away from the injection unit 101. Alternatively, after the disengagement of the first element 101b and the injector 101a from the second element 102s, the injection unit 101 is displaced away from the molding device 102. In some embodiments, the second element 102s and the molding device 102 are horizontally moved away from the first element 101b and the injector 101a along an arrow K as shown in FIG. 16. Alternatively, the first element 101b and the injector 101a are horizontally moved away from the second element 102s and the molding device 102 along an arrow M as shown in FIG. 16. FIG. 17 illustrates the injection unit 101 and the second element 102s are away from each other after the displacement of the second element 102s away from the injection unit 101.

Figure 18:
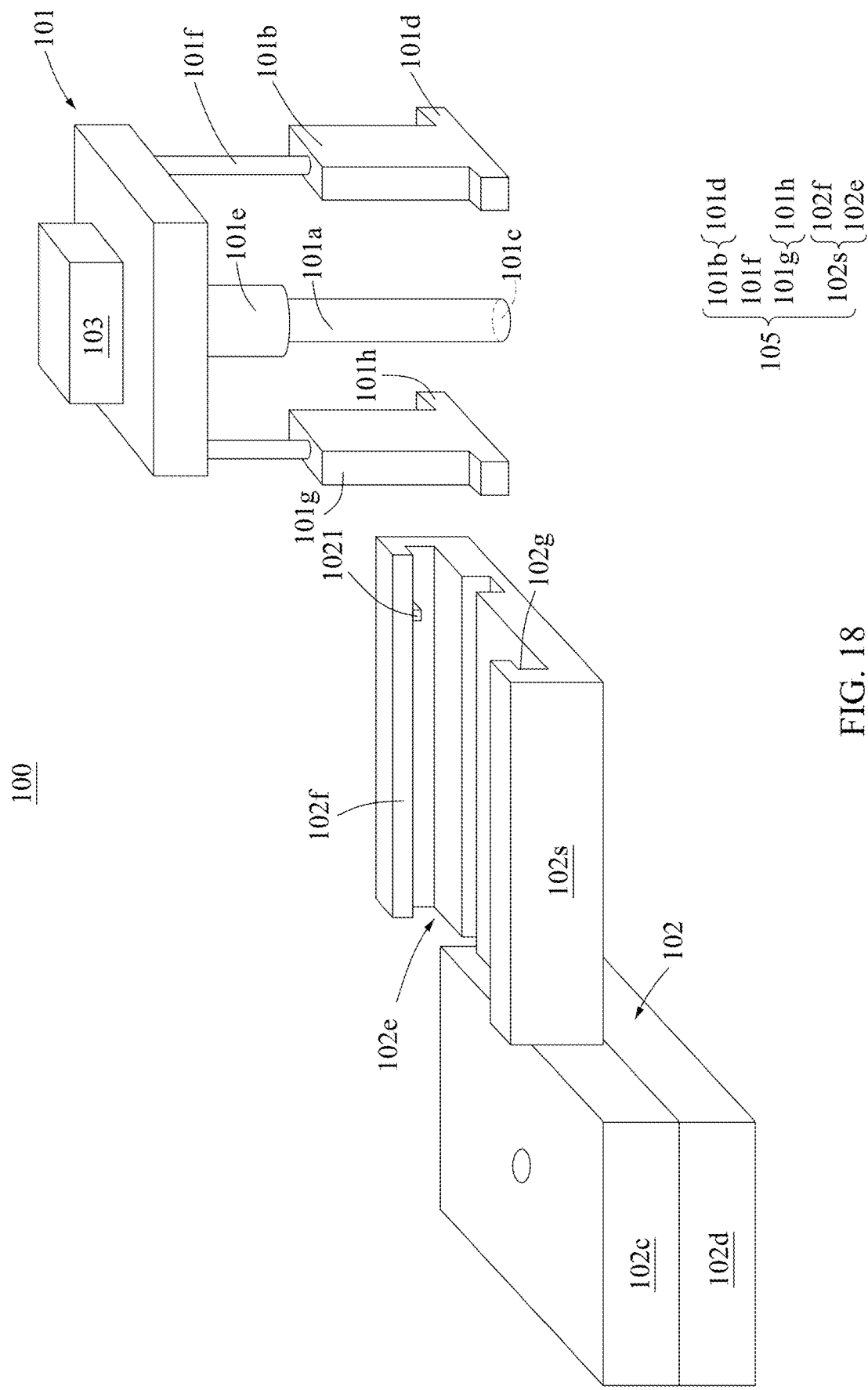

In operation 212, referring to FIG. 18, the molding device 102 are displaced away from the second element 102s or displacing the second element 102s away from the molding device 102.

In some embodiments, after the disengagement of the molding device 102 from the second element 102s, the molding device 102 is displaced away from the second element 102s. In some embodiments, the molding device 102 is displaced away from the second element 102s by rotating a carrier (not shown) holding or disposed under the molding device 102. Alternatively, after the disengagement of the second element 102s from the molding device 102, the injection unit 101, the molding device 102 and the second element 102s are separated from each other. In some embodiments, the molding device 102 is horizontally moved away from the second element 102s. Alternatively, the second element 102s are horizontally moved away from the molding device 102. FIG. 18 illustrates the second element 102s and the molding device 102 are away from each other after the displacement of the molding device 102 away from the second element 102s.

Figure 19:
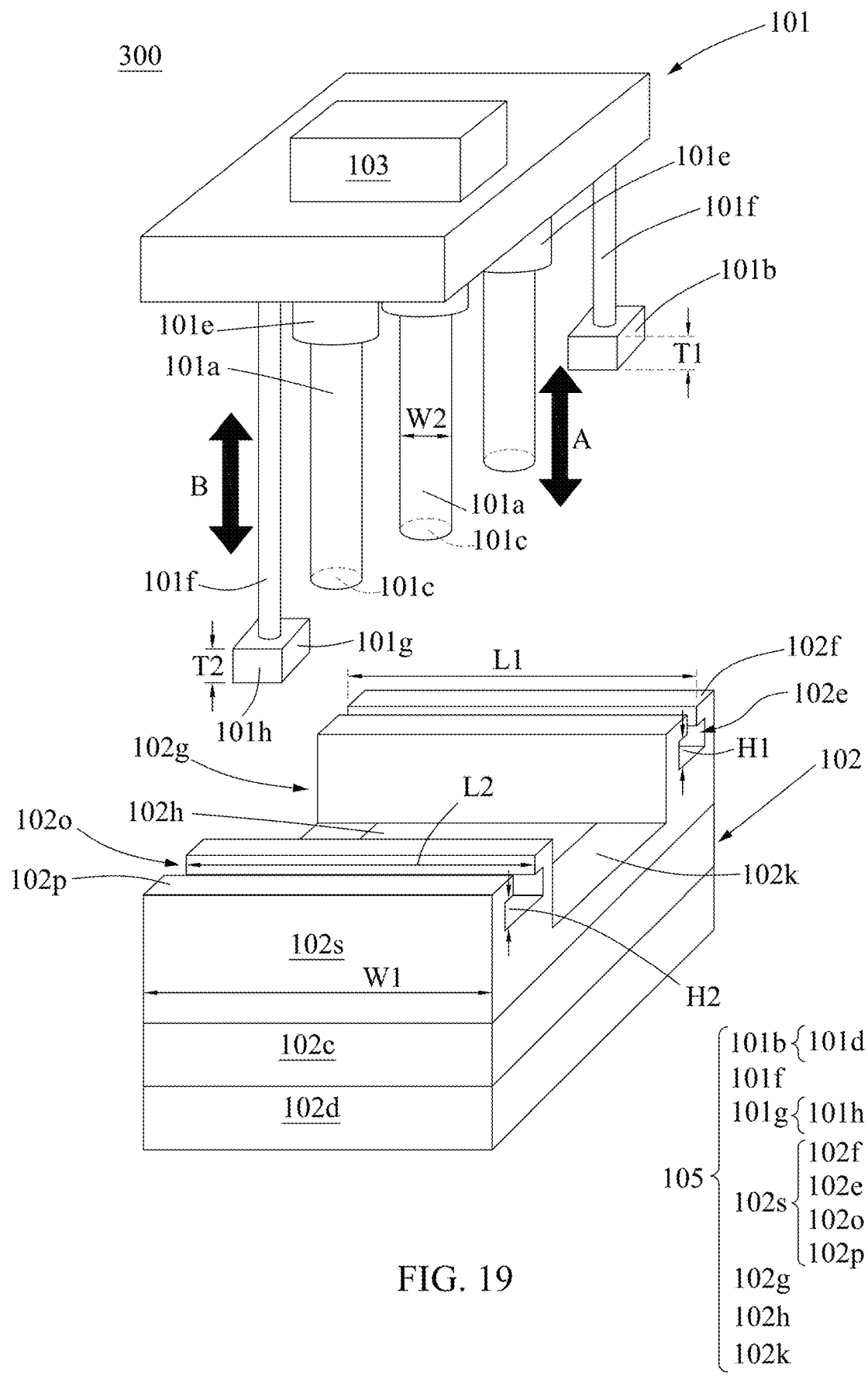
FIG. 19 is a schematic diagram of an injection molding system in accordance with some embodiments of the present disclosure.

FIG. 19 illustrates a schematic perspective view of a second injection molding system 300 according to an embodiment of the present disclosure. In some embodiments, referring to FIG. 19, the second injection molding system 300 includes an injection unit 101, a molding device 102 and a supporting device 105 disposed between the injection unit 101 and the molding device 102. In some embodiments, the second injection molding system 300 further includes a flowable mixture supplying unit 103 communicable with the injection unit 101. In some embodiments, the flowable mixture supplying unit 103 is configured to produce and supply a flowable mixture to the injection unit 101. In some embodiments, the flowable mixture includes a polymeric material such as ethylene vinyl acetate (EVA), styrene-ethylene-butylene-styrene (SEBS), thermoplastic polyurethanes (TPU), thermoplastic polyester elastomer (TPEE) or the like. In some embodiments, the flowable mixture includes a recyclable material. In some embodiments, the flowable mixture further includes a blowing agent.

In some embodiments, the flowable mixture supplying unit 103 of the second injection molding system 300 includes an extruder (not shown) for converting the polymeric material into the molten state and a mixer (not shown) for mixing the blowing agent into the polymeric material. The polymeric material is flowable from the extruder into the mixer.

In some embodiments, the injection unit 101 includes several injectors 101*a* disposed between a first element 101*b* and a third element 101*g* of a supporting device 105. In some embodiments, the supporting device 105 surrounds the injectors 101*a*. In some embodiments, each of the injectors 101*a* is configured to receive the flowable mixture from the flowable mixture supplying unit 103 and discharge the flowable mixture from its outlet 101*c*. In some embodiments, each of the injectors 101*a* is communicable with the mixer or the flowable mixture supplying unit 103. In some embodiments, the flowable mixture is discharged from the injector 101*a* into the molding device 102. Each of the injectors 101*a* is engageable with a second element 102*s* of the supporting device 105. In some embodiments, the injectors 101*a* are all engaged with the second element 102*s*. In some embodiments, each of the injectors 101*a* is vertically extendable/retractable in a first direction as shown by an arrow A. In some embodiments, the injectors 101*a* are extendable/retractable independent from each other. In some embodiments, each of the injectors 101*a* is extendable/retractable by a hydraulic mechanism 101*e*. In some embodiments, the movement of each injectors 101*a* is actuated and controlled by one hydraulic mechanism 101*e*.

In some embodiments, the supporting device 105 is configured to facilitate an engagement of the injection unit 101 and the molding device 102. In some embodiments, the supporting device 105 include the first element 101*b*, the third element 101*g* disposed adjacent to the injectors 101*a*, and the second element 102*s* dispose on the molding device 102. In some embodiments, the first element 101*b* and the third element 101*g* are engageable with the second element 102*s*. The first element 101*b* and the third element 101*g* are extendable toward the molding device 102 and retractable from the molding device 102 respectively. In some embodiments, each of the first element 101*b* and the third element 101*g* is vertically extendable/retractable in a way as shown by a second direction as shown by an arrow B. In some embodiments, each of the first element 101*b* and the third element 101*g* is extendable/retractable along a rail 101*f* by a motor (not shown) or the like. In some embodiments, each of the first element 101*b* and the third element 101*g* is moved along the rail 101*f*, and the movement of each of the first element 101*b* and the third element 101*g* is actuated and controlled by one motor. In some embodiments, the first direction and the second direction are in parallel.

In some embodiments, the injector 101*a*, the first element 101*b* and the third element 101*g* are extendable/retractable independent from each other. The injector 101*a*, the first element 101*b* and the third element 101*g* can be displaced relative to each other. In some embodiments, the injector 101*a*, the first element 101*b* and the third element 101*g* can be displaced separately or consistently. In some embodiments, all injectors 101*a* are moved consistently with each other, and the first element 101*b* and the third element 101*g* are moved consistently with each other. In some embodiments, each of the first element 101*b* and the third element 101*g* is in a T shape. In some embodiments, the first element 101*b* includes a protruding portion 101*d* engageable with the second element 102*s*, and the third element 101*g* includes a protruding portion 101*h* engageable with the second element 102*s*.

In some embodiments, the injection unit 101 is disposed above the molding device 102. In some embodiments, the injector 101*a*, the first element 101*b* and the third element 101*g* are disposed above the molding device 102. In some embodiments, the molding device 102 is configured to receive the flowable mixture discharged from the injectors 101*a* through the outlets 101*c*.

In some embodiments, the molding device 102 includes a first mold 102*c* and a second mold 102*d* engageable with the first mold 102*c*. In some embodiments, the first mold 102*c* is an upper mold, and the second mold 102*d* is a lower mold. In some embodiments, the second element 102*s* is engageable with the first mold 102*c*. In some embodiments, the molding device 102 is disposed on a carrier (not shown) and may be moved together with the carrier. In some embodiments, a plurality of molding devices 102 are disposed on the carrier, and the molding devices are arranged in a line, a row, a column, an arc, a curve or any other suitable arrangements. In some embodiments, the carrier is rotatable.

Figure 20:
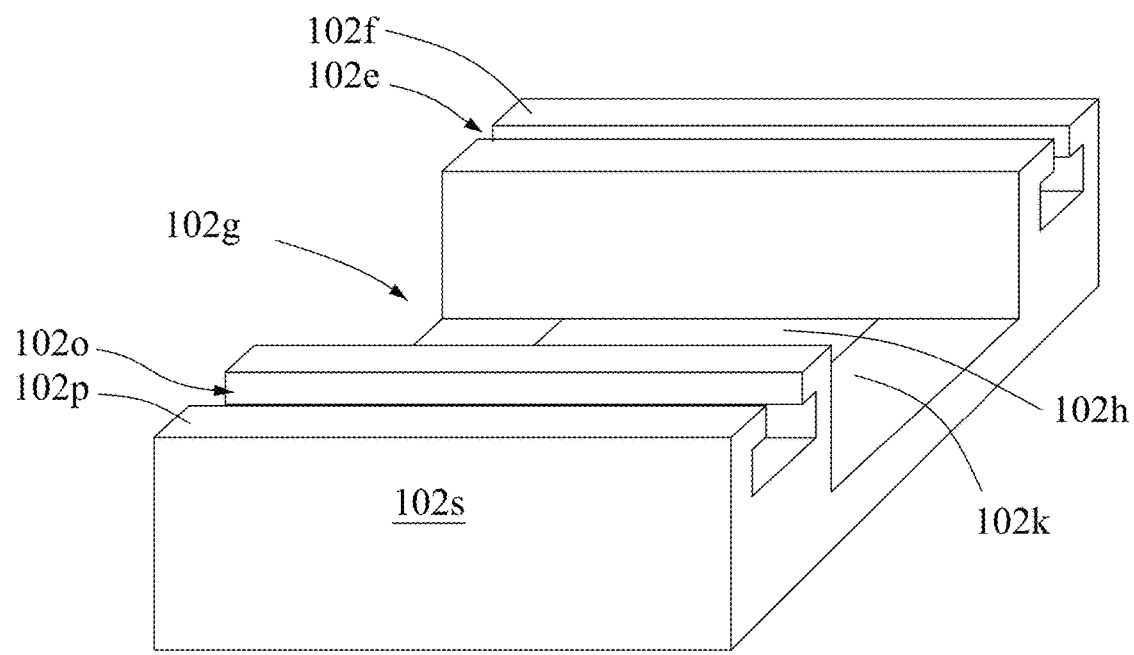
FIG. 20 is a schematic diagram illustrating a portion of an injection molding system in accordance with some embodiments of the present disclosure.
Figure 21:
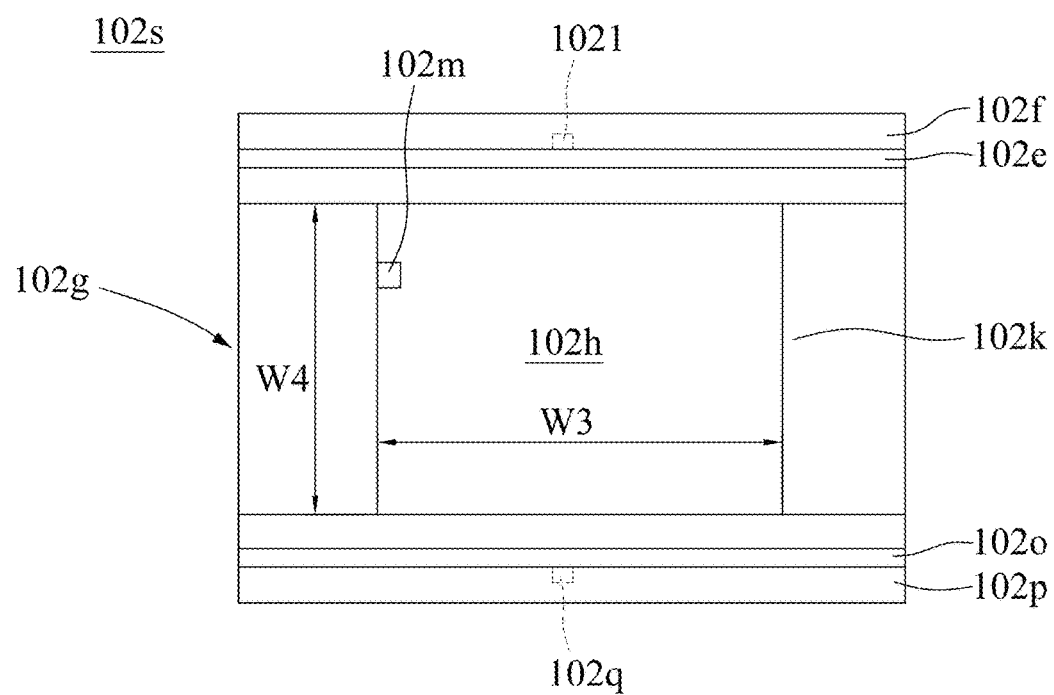
FIG. 21 is a schematic top view illustrating a portion of an injection molding system in accordance with some embodiments of the present disclosure.

FIG. 20 illustrates a schematic perspective view of the second element 102*s*, and FIG. 21 illustrates a schematic top view of the second element 102*s*. In some embodiments, referring to FIG. 19 to 21, the supporting device 105 includes a second element 102*s* engageable with the first element 101*b* and the third element 101*g*. In some embodiments, the second element 102*s* is disposed on the molding device 102. In some embodiments, the second element 102*s* includes a slot 102*e* defined by a protrusion 102*f* and a slot 102*o* defined by a protrusion 102*p*.

In some embodiments, the slots 102*e*, 102*o* and the protrusions 102*f*, 102*p* are laterally elongated. The slot 102*e* is configured to receive the protruding portion 101*d* of the first element 101*b* of the supporting device 105. The slot 102*o* is configured to receive the protruding portion 101*f* of the third element 101*g* of the supporting device 105. In some embodiments, the protruding portion 101*d* of the first element 101*b* is slidable within and along the slot 102*e* of the second element 102*s*, and the protruding portion 101*f* of the third element 101*g* is slidable within and along the slot 102*o* of the second element 102*s*. In some embodiments, each of a length L1 of the slot 102*e* and a length L2 of the slot 102*o* equals to a width W1 of the second element 102*s*. In some embodiments, a height H1 of the slot 102*e* of the second element 102*s* is greater than a thickness T1 of the protruding portion 101*d* of the first element 101*b*, and a height H2 of the slot 102*o* of the second element 102*s* is greater than a thickness T2 of the protruding portion 101*h* of the third element 101*g*. In some embodiments, each of the protruding portion 101*d* of the first element 101*b* and the protruding portion 101h of the third element 101g is in a T-shape and configured to receive by the slot 102e and the slot 102o respectively.

In some embodiments, the molding device 102 includes a groove 102g configured to receive the outlet 101e. In some embodiments, the groove 102g is disposed on the second element 102s and laterally elongated along the second element 102s. In some embodiments, the groove 102g is in parallel to the protrusion 102f and the protrusion 102p. The groove 102g is configured to receive the outlets 101c or an end portions of the injectors 101a of the injection unit 101. The outlets 101c or the end portions of the injectors 101a are slidable within and along the groove 102g. In some embodiments, an opening 102h is disposed within the groove 102g. In some embodiments, the opening 102h extends through the second element 102s. The outlets 101c or the end portions of the injectors 101a are receivable by the opening 102h. The outlets 101c or the end portions of the injectors 101a are movable within the opening 102h. In some embodiments, a width W3 of the opening 102h is substantially greater than a total widths W2 of the outlets 101c of the injector 101a. In some embodiments, all of the outlets 101c of the injectors 101a are receivable by the opening 102h.

In some embodiments, a first sensor 102l is disposed within the slot 102e and configured to sense a contact of the protruding portion 101d and the slot 102e, and a third sensor 102q is disposed within the slot 102o and configured to sense a contact of the protruding portion 101h and the slot 102o. In some embodiments, the first sensor 102l is disposed at the middle end of the slot 102e, and the third sensor 102q is disposed at the middle end of the slot 102o. The first sensor 102l and the third sensor 102q are not limited to any particular type, as long as it can sense the pressure and provide pressure information.

In some embodiments, a plurality of first sensors 102l are disposed within the slots 102e, and the first sensors 102l are configured to sense a position and the contact of the protruding portion 101d and the slot 102e. In some embodiments, a plurality of third sensors 102q are disposed within the slots 102o, and the third sensors 102q are configured to sense a position and the contact of the protruding portion 101h and the slot 102o. The number and location of the plurality of third sensors 102q are not particularly limited; for example, they can be arranged at anywhere of the protrusion 102p and within the slot 102o; however, the present invention is not limited thereto.

In some embodiments, a step 102k is formed within the groove 102g and adjacent to the opening 102h. In some embodiments, a second sensor 102m is disposed within the groove 102g and configured to sense a contact of the outlets 101c and the groove 102g.

In some embodiments, a second sensor 102m is disposed within the opening 102h. The second sensor 102m is not limited to any particular type, as long as it can sense the pressure and provide pressure information. In some embodiments, a plurality of second sensor 102m are disposed within the opening 102h, and the second sensor 102m are configured to sense a position and the contact of the outlets 101c and the molding device 102. The number and location of the plurality of second sensors 102m are not particularly limited; for example, they can be arranged at anywhere of the opening 102h; however, the present invention is not limited thereto.

Figure 22:
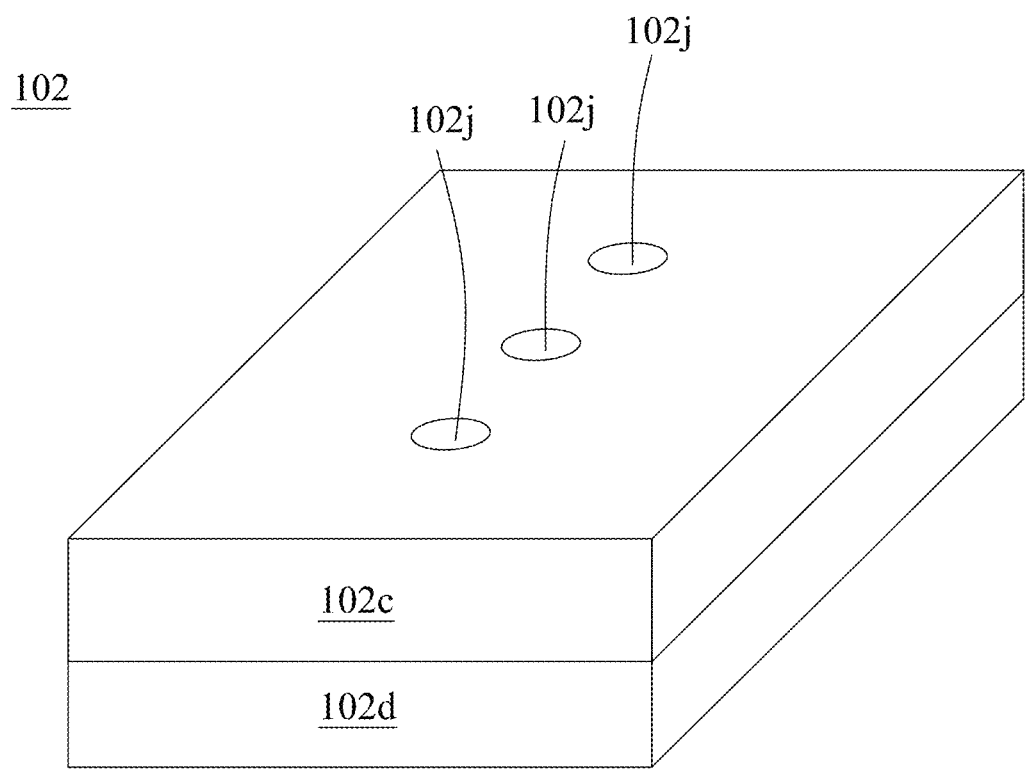
FIG. 22 is a schematic diagram illustrating a portion of an injection molding system in accordance with some embodiments of the present disclosure.
Figure 23:
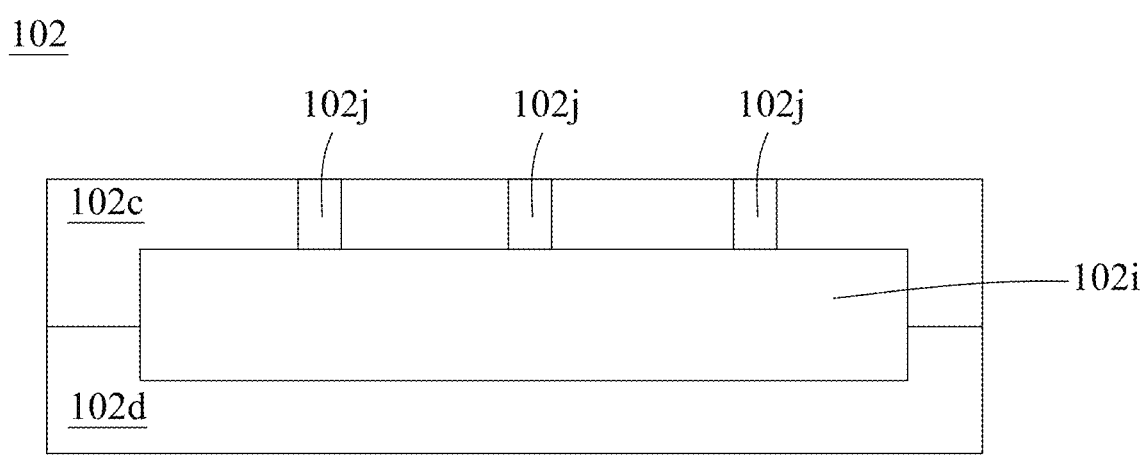
FIG. 23 is a schematic cross-sectional view illustrating a portion of an injection molding system in accordance with some embodiments of the present disclosure.

In some embodiments, the molding device 102 can be in an open state and a closed state. The first mold 102c is engaged with the second mold 102d when the molding device 102 is in the closed state. FIG. 22 illustrates a schematic perspective view of the molding device 102 in a closed state, and FIG. 23 illustrates a schematic cross-sectional view of the molding device 102 in the closed state. In some embodiments, a mold cavity 102i is defined by the first mold 102c and the second mold 102d when the molding device 102 is in the closed state. In some embodiments, the first mold 102c and the second mold 102d define more than one mold cavities 102i. In some embodiments, the mold cavities 102i are isolated from each other. In some embodiments, the mold cavity 102i is configured to receive the flowable mixture from the injectors 101a through the opening 102h of the second element 102s and the feeding ports 102j. The mold cavity 102i is accessible only through a feeding port 102j when the molding device 102 is in the closed state. The mold cavity 102i is accessible through a gap (not shown) between the first mold 102c and the second mold 102d when the molding device 102 is in the open state. In some embodiments, the molding device 102 includes the feeding port 102j communicable with the mold cavity 102i. In some embodiments, the feeding port 102j is disposed at and penetrates through the first mold 102c. In some embodiments, the molding device 102 includes several feeding ports 102j as shown in FIGS. 22 and 23. The feeding ports 102j correspond to the mold cavities 102i respectively. In some embodiments, the opening 102h is aligned with the feeding ports 102j when the second element 102s is disposed over the molding device 102, so that the flowable mixture can flow from the injectors 101a into the mold cavity 102i through the opening 102h and the feeding ports 102j. In some embodiments, the opening 102h is disposed above all of the feeding ports 102j. In some embodiments, the opening 102h is overlapped with the feeding ports 102j when the second element 102s is disposed over the molding device 102 from a top view.

Figure 24:
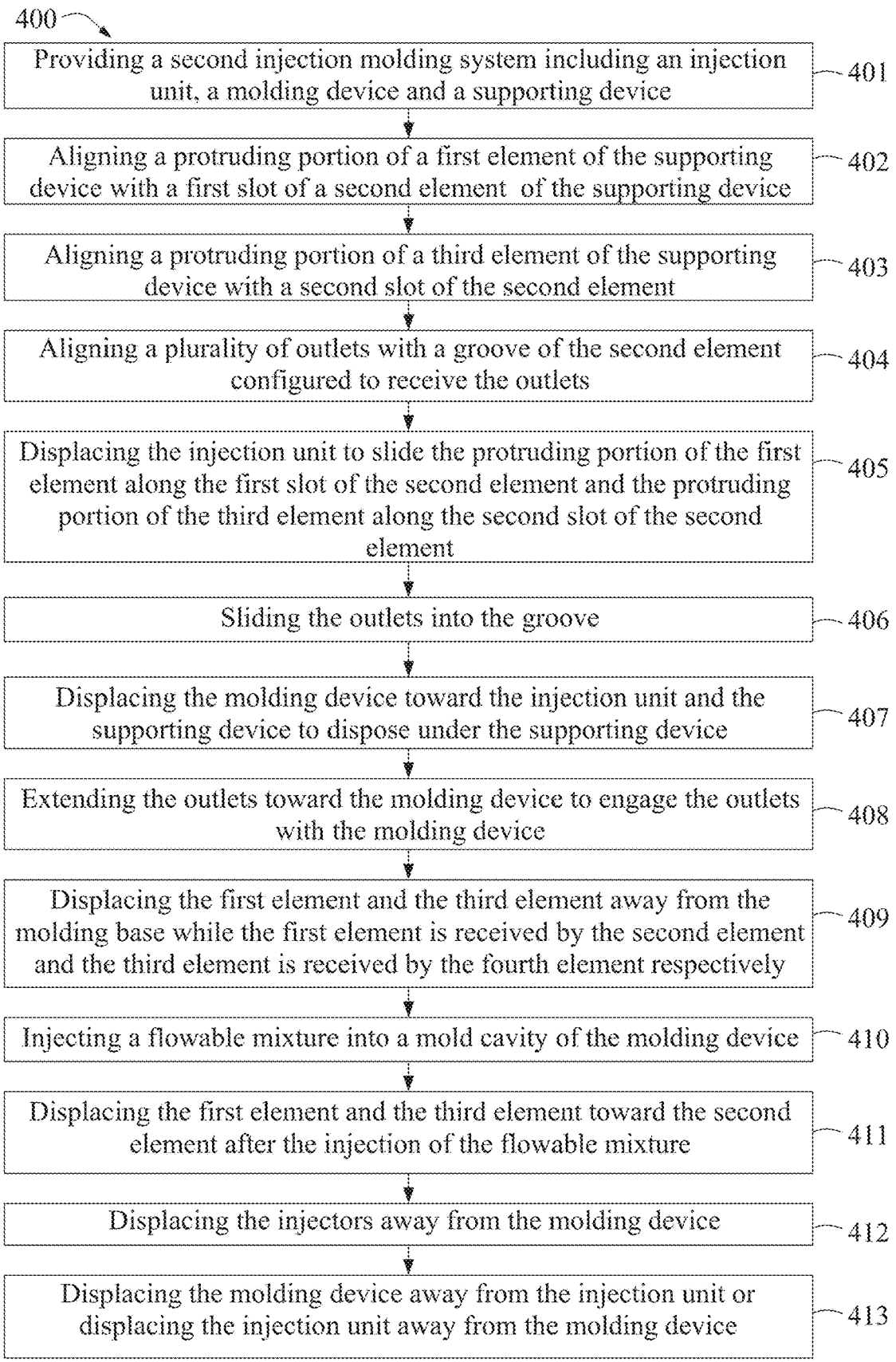
FIG. 24 is a flowchart illustrating an injection molding method in accordance with some embodiments of the present disclosure.

In the present disclosure, a second injection molding method 400 is also disclosed. The second injection molding method 400 includes a number of operations, and the description and illustrations are not deemed as a limitation of the sequence of the operations. FIG. 24 is an embodiment of the second injection molding method 400. In some embodiments, the second injection molding method 400 includes a number of operations (401 to 413). FIGS. 25-36 are schematic cross-sectional views of various stages of the second injection molding method in accordance with some embodiments of the present disclosure. In some embodiments, the second injection molding method 400 is implemented by the second injection molding system 300 as illustrated in FIGS. 19-23 and discussed above.

Figure 25:
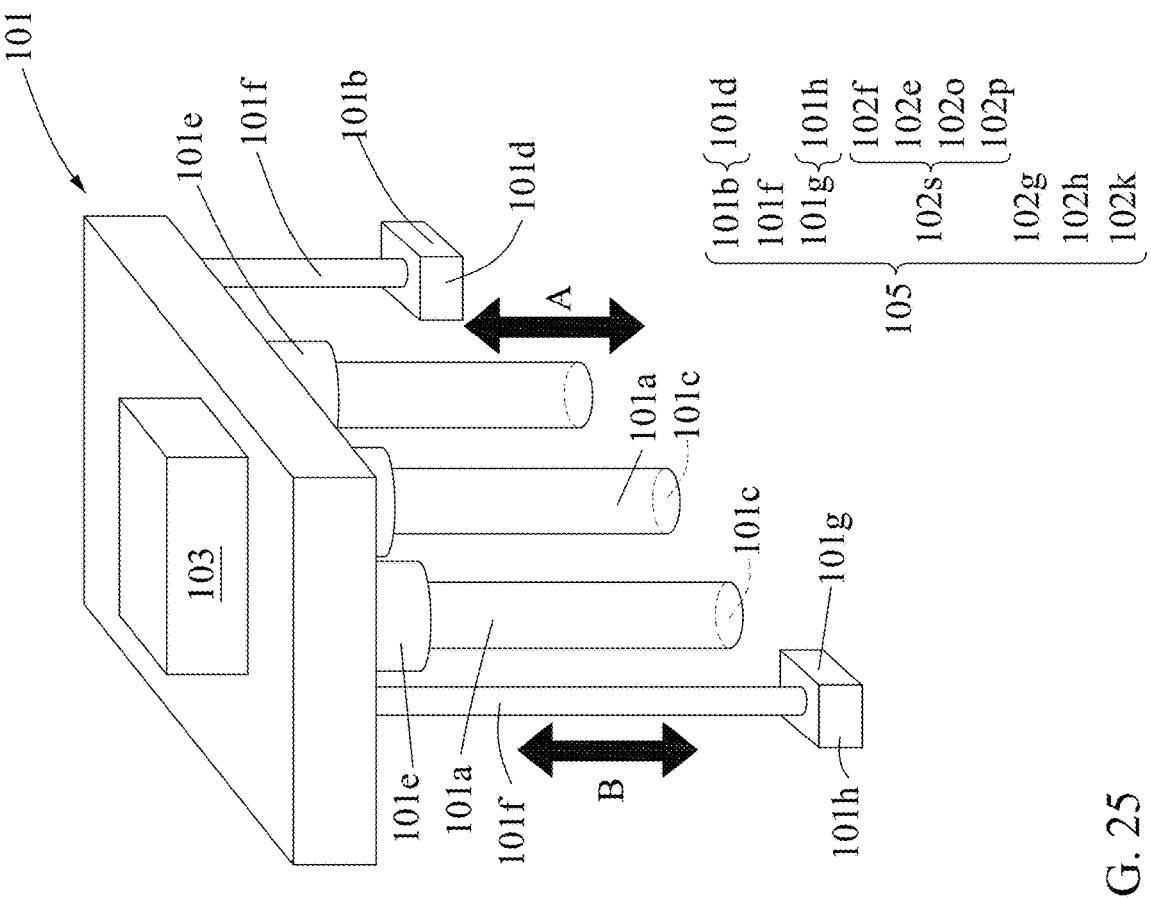
FIGS. 25 to 36 are side views or schematic cross-sectional views of an injection molding system at one or more manufacturing stages of an injection molding method in accordance with some embodiments of the present disclosure.
Figure 25:
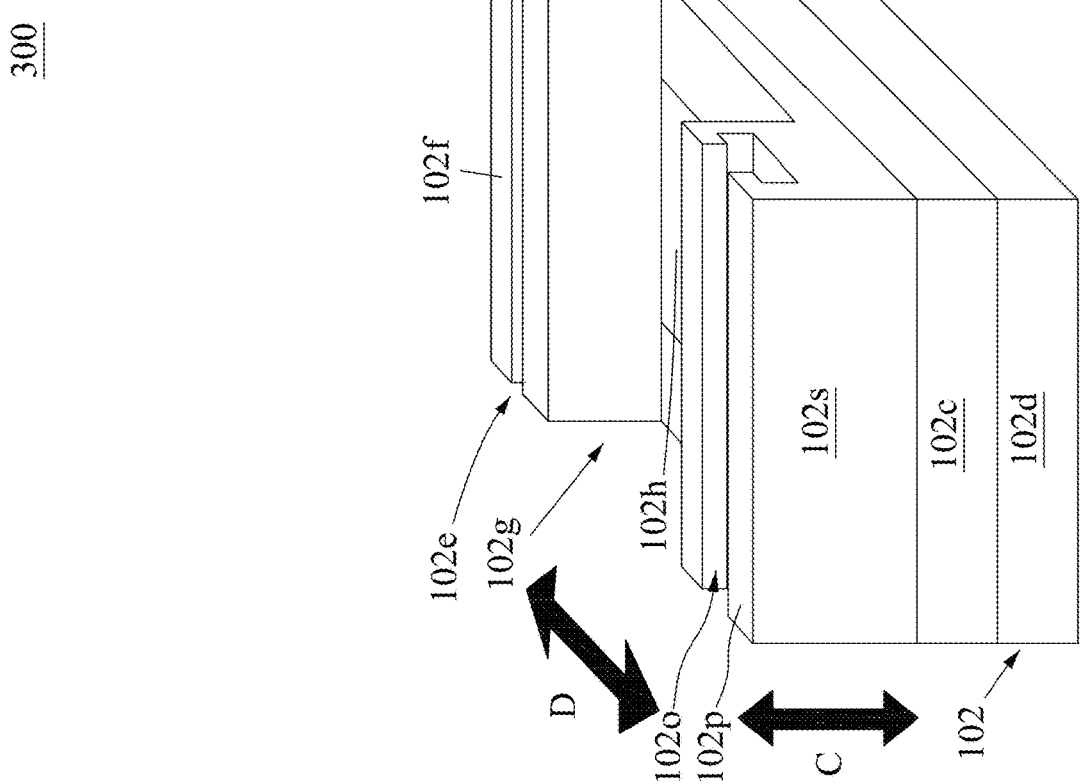

In operation 401, referring to FIG. 25, a second injection molding system 300 including an injection unit 101, a molding device 102 and a supporting device 105 is provided. In some embodiments, the second injection molding system 300 includes the injection unit 101, the molding device 102 and the supporting device 105 as discussed above. The molding device 102 is in the closed state. The opening 102h of the second element 102s is aligned with several feeding ports 102j of the molding device 102, so that the mold cavity 102i is accessible through the opening 102h and the feeding ports 102j.

In operation 402, a protruding portion 101d of a first element 101b of the supporting device 105 is aligned with a first slot 102e of the second element 102s of the supporting device 105. In operation 403, a protruding portion 101h of a third element 101g of the supporting device is aligned with a second slot 102e of the second element 102s. In operation 404, a plurality of outlets 101c are aligned with a groove 102g of the second element 102s configured to receive the outlets 101c. In some embodiments, the alignment of the protruding portion 101d of the first element 101b with the first slot 102e of the second element 102s, the alignment of the protruding portion 101h of the third element 101g with the second slot 102e of the second element 102s, and the alignment of the outlets 101c with the groove 102g are performed simultaneously.

In some embodiments, the injectors 101a are vertically displaced along the arrow A in order to horizontally align with the groove 102g, and the first element 101b and the third element 101g are vertically displaced along the arrow B in order to horizontally align with the first slot 102e and the second slot 102e respectively as shown in FIG. 25. In some embodiments, the injectors 101a move upward or downward in order to horizontally align with the groove 102g. In some embodiments, the first element 101b and the third element 101g move upward or downward in order to horizontally align with the first slot 102e and the second slot 102e respectively. Alternatively or simultaneously, the molding device 102 is displaced along the arrow C and/or the arrow D in order to horizontally align with the protruding portion 101d of the first element 101b, the protruding portion 101h of the third element 101g, and the outlets 101c or the end portions of the injectors 101a. In some embodiments, the molding device 102 is moved upward, downward, forward and/or backward in order to horizontally align the first slot 102e with the protruding portion 101d, horizontally align the second slot 102e with the protruding portion 101h, and horizontally align the groove 102g with the outlets 101c or the end portions of the injectors 101a.

Figure 26:
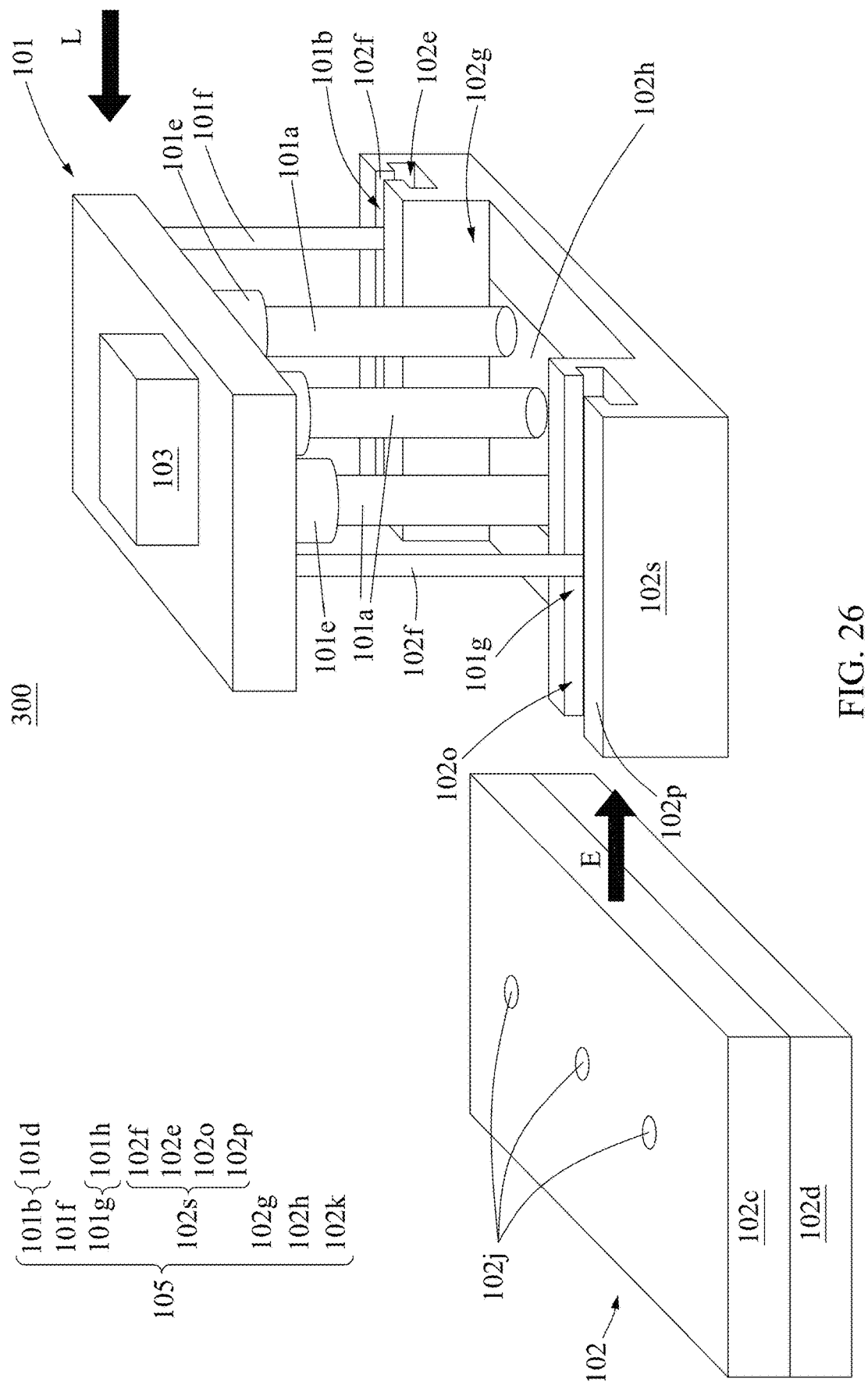
Figure 27:
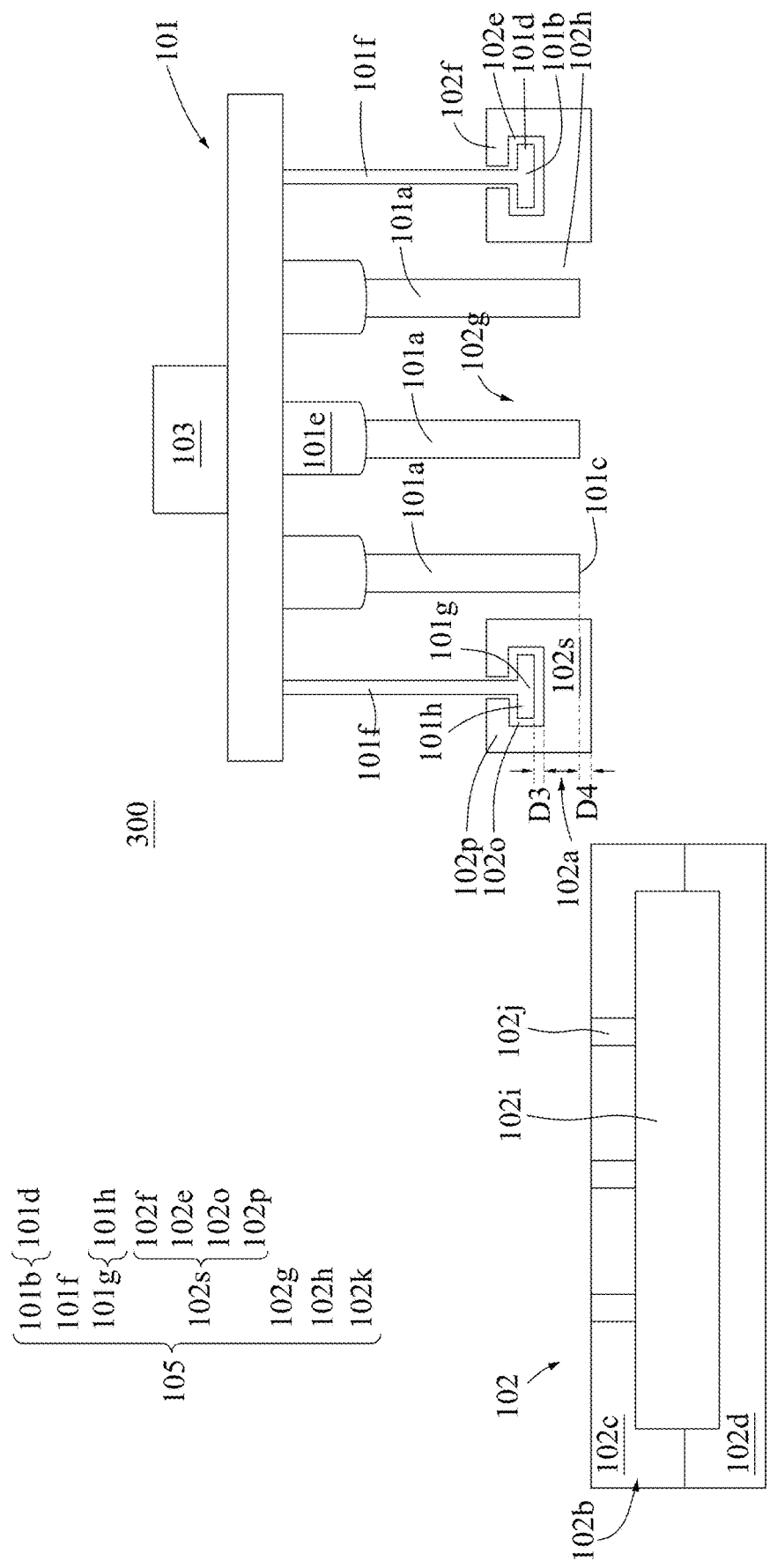

In operation 405, referring to FIGS. 26 and 27, the injection unit 101 is displaced to slide the protruding portion 101d of the first element 101b along the first slot 102e of the second element 102s and the protruding portion 101h of the third element 101g along the second slot 102e of the second element 102s. In operation 406, the outlets 101c are slide into the groove 102g.

In some embodiments, after the horizontal alignment, the second element 102s is moved towards the injection unit 101 along an arrow E as shown in FIG. 26. Alternatively, after the horizontal alignment, the injection unit 101 is moved towards the second element 102s along an arrow L as shown in FIG. 26. FIG. 27 is a schematic cross-sectional view of the second injection molding system 300 of FIG. 26. In some embodiments, the first element 101b slides along the first slot 102e, the third element 101g slides along the second slot 102e, and the outlets 101c or the end portions of the injectors 101a slide along the groove 102g. In some embodiments, the second element 102s is moved until the first element 101b is disposed within the first slot 102e, the third element 101g is disposed within the second slot 102e, and the outlets 101c or the end portions of the injectors 101a are vertically aligned with the opening 102h. As shown in FIG. 27, the protrusion 102f is disposed opposite to the protruding portion 101d of the first element 101b, and the protrusion 102p is disposed opposite to the protruding portion 101h of the third element 101g. The first element 101b, the third element 101g and the injectors 101a are not in contact with the second element 102s. In some embodiments, the outlets 101c of the injectors 101a are align with the opening 102h respectively. In some embodiments, a distance D3 between a bottom surface of the protruding portion 101h and the second element 102s is substantially greater than a distance D4 between the end of the outlet 101c and a top surface of the molding device 102.

Figure 28:
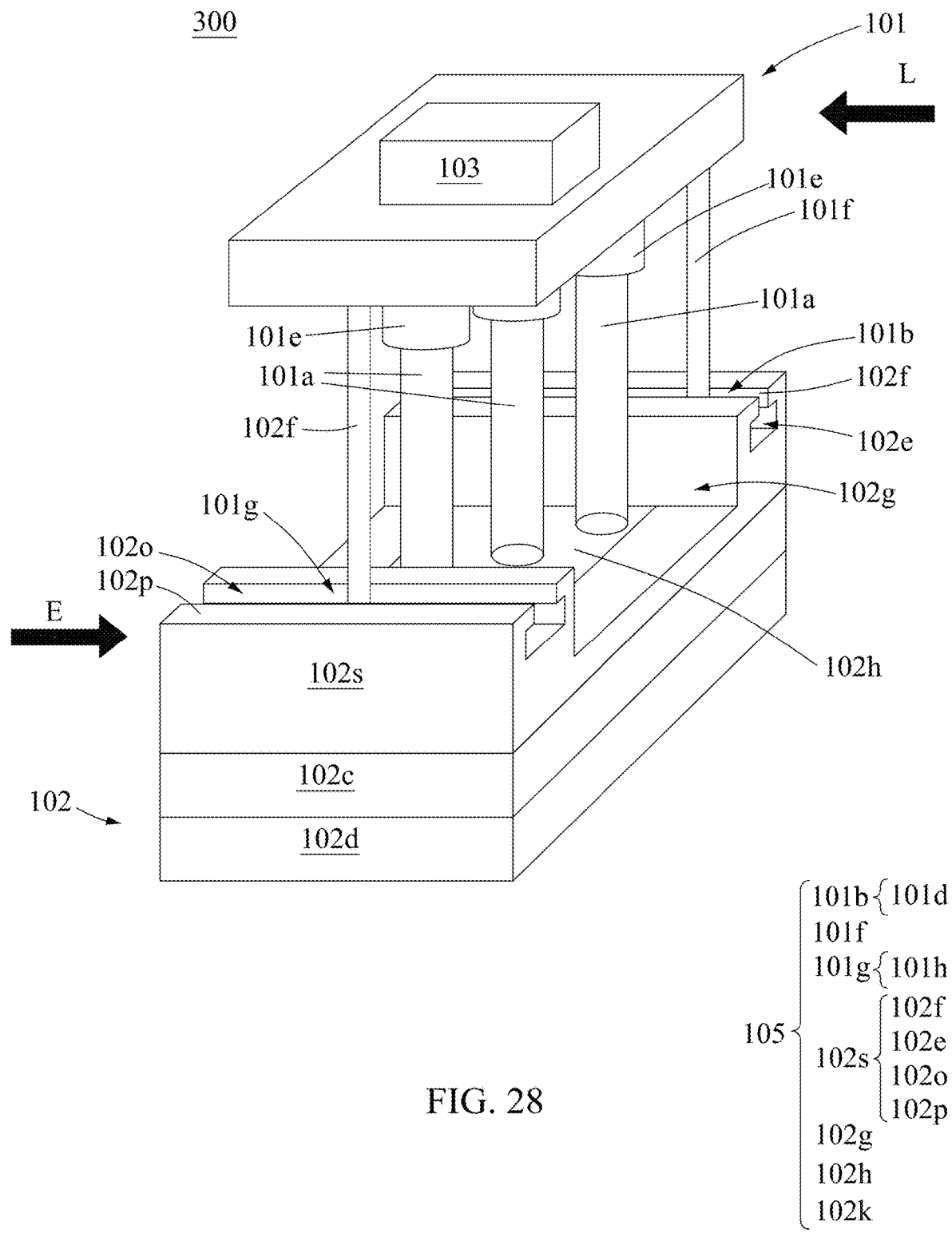

In operation 407, the molding device 102 is displaced toward the injection unit 101 and the supporting device 105 to dispose under the supporting device 105. In some embodiments, referring to FIG. 28, after the alignment of the injector 101a with the opening 102h, the injector 101a and the first element 101b move towards the molding device 102 along an arrow F as shown in FIG. 28. In some embodiments, the molding device 102 is moved until the supporting device 105 covers the molding device 102 and the injectors 101a are vertically align with a feeding ports 102j of the molding device 102. In some embodiments, the molding device 102 is moved by moving, such as rotating, the carrier (not shown) disposed under the molding device 102. In some embodiments, the molding device 102 is moved until the outlets 101c or the end portions of the injectors 101a are vertically aligned with the feeding ports 102j of the molding device 102.

Figure 29:
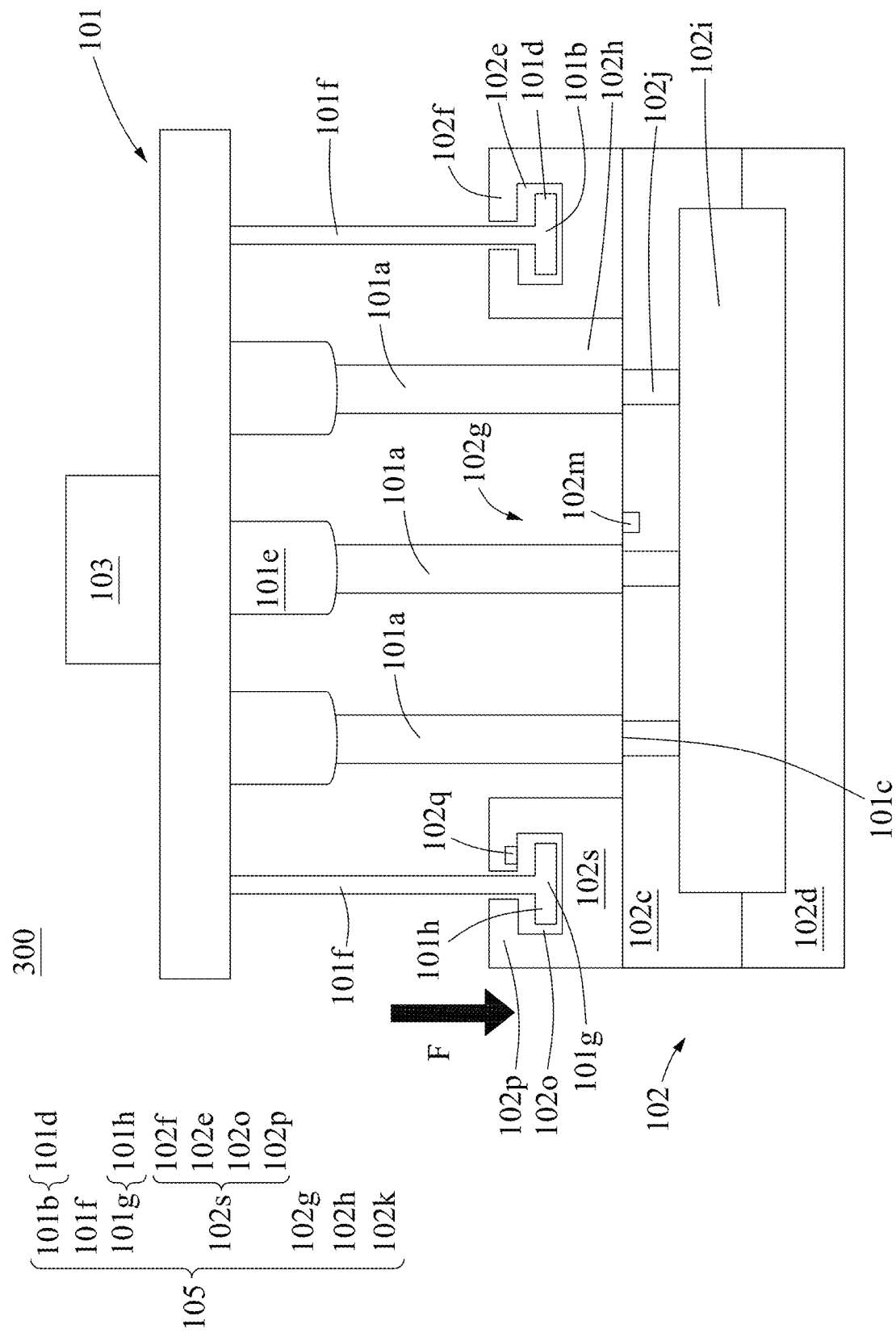

In operation 408, referring to FIG. 29, the outlets 101c are extended toward the molding device 102 to engaging the outlets 101c with the molding device 102.

In some embodiments, after the alignment of the injectors 101a with the opening 102h, the injectors 101a, the first element 101b and the third element 101g move towards the molding device 102 along an arrow F as shown in FIG. 28, until the outlets 101c of the injectors 101a contacts the second element 102s. In some embodiments, the outlets 101c are in contact with the first mold 102c. In some embodiments, the injectors 101a, the first element 101b and the third element 101g are moved consistently. When the outlets 101c of the injector 101a contacts the first mold 102c, the entire first element 101b and the entire third element 101g are still not in contact with the second element 102s, as shown in FIG. 29. In some embodiments, a contact of the molding device 102 and the outlets 101c is sensed by a second sensor 102m disposed within the groove 102g. In some embodiments, a contact of the molding device 102 and the outlets 102c is sensed continuously.

Figure 30:
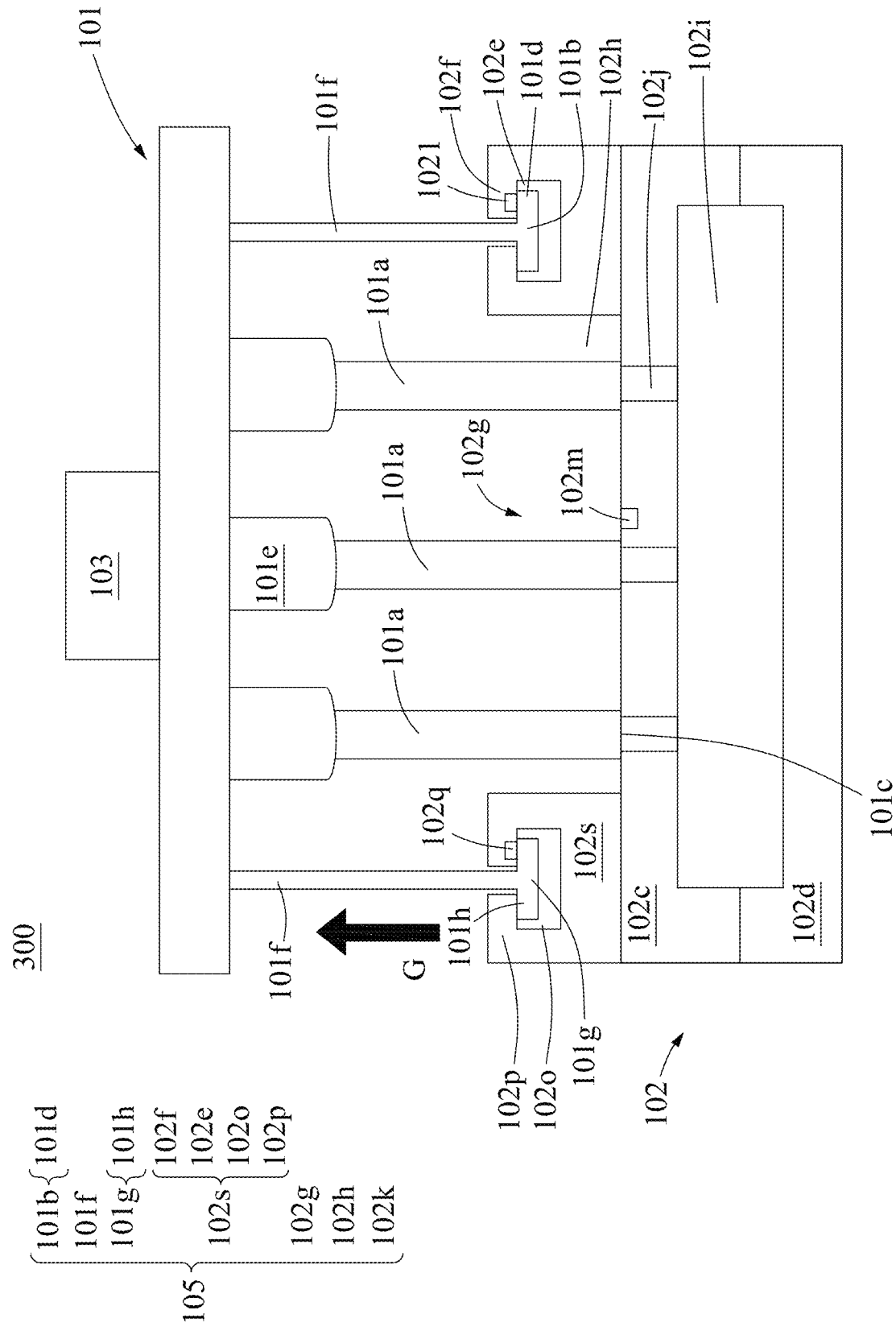

In operation 409, referring to FIG. 30, the first element 101b and the third element 101g are displaced away from the second element 102s while the first element 101b and the third element 101g are received by the second element 102s. In some embodiments, the protruding portion 101d of the first element 101b is moved to abut against a protrusion 102f of the second element 102s while the protruding portion 101d of the first element 101b is received by the first slot 102e of the second element 102s, and the protruding portion 101h of the third element 101g is moved to abut against the protrusion 102p of the second element 102s while the protruding portion 101h of the third element 101g is received by the second slot 102e of the second element 102s.

In some embodiments, after the contact of the outlets 101c with the molding device 102, the first element 101b and the third element 101g move away from the second element 102s along an arrow G as shown in FIG. 30, until the protruding portion 101d of the first element 101b and the protruding portion 101h of the third element 101g contacts the protrusion 102f and the protrusion 102p of the second element 102s respectively. In some embodiments, the injectors 101a remain stationary when the first element 101b and third element 101g are moving upward as shown in FIG. 30. As a result, the first element 101b and third element 101g are engaged with the second element 102s.

In some embodiments, the contact of the second element 102s and the first element 101b is sensed by the first sensor 102l. In some embodiments, the contact of the protrusion 102f and the protruding portion 101d of the first element 101b is sensed by the first sensor 102l. In some embodiments, a contact of the second element 102s and the first element 101b is sensed continuously. In some embodiments, a contact of the second element 102s and the third element 101g is sensed by a third sensor 102q disposed on the protrusion 102p and within the second slot 102e. In some embodiments, the contact of the second element 102s and the third element 101g is sensed by the third sensor 102q. In some embodiments, the contact of the protrusion 102p and the protruding portion 101h of the third element 101g is sensed by the third sensor 102q. In some embodiments, a contact of the second element 102s and the third element 101g is sensed continuously.

Figure 31:
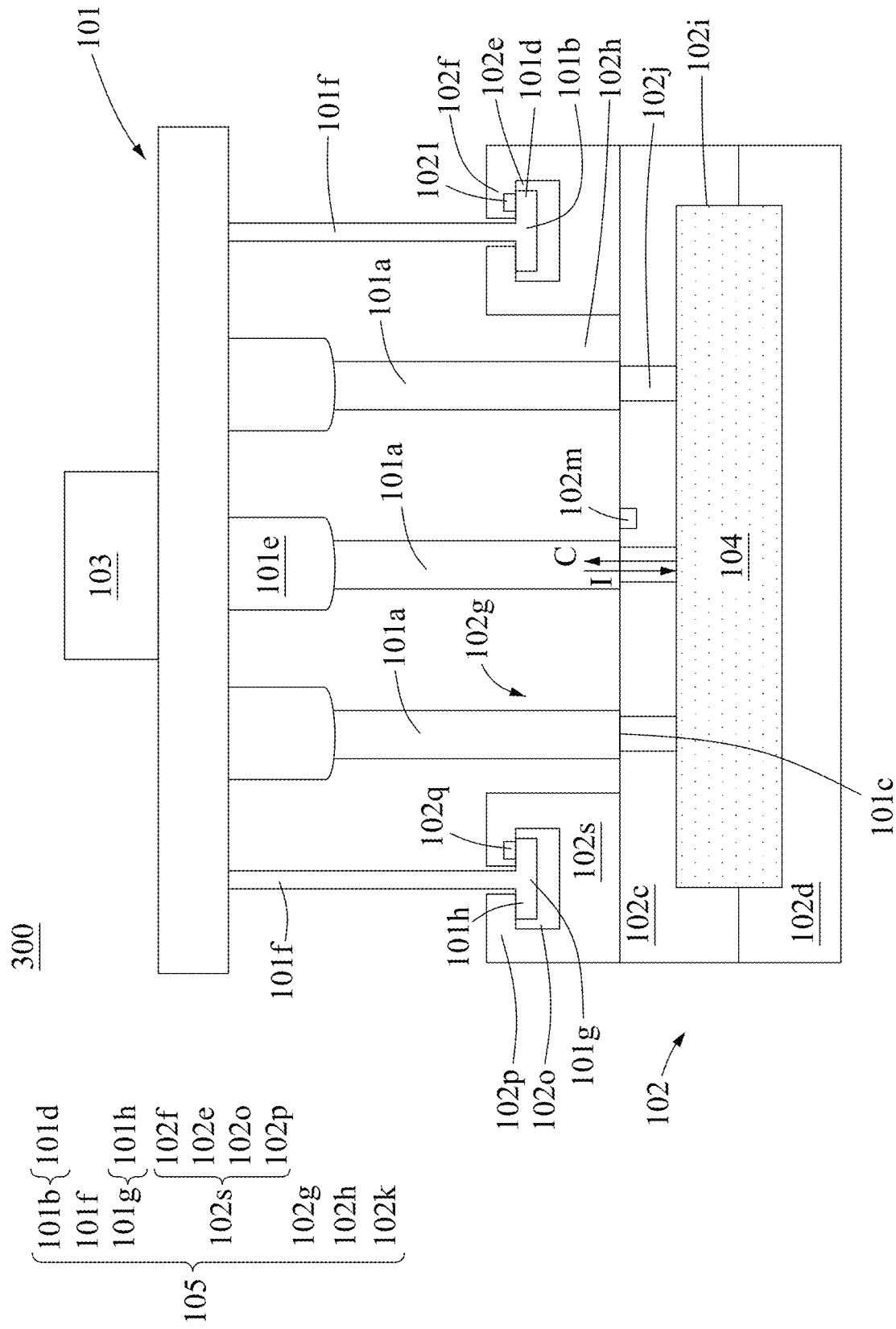

In operation 410, referring to FIG. 31, a flowable mixture 104 is injected into a mold cavity 102i of the molding device 102.

In some embodiments, after the contact of the protruding portion 101d with the protrusion 102f and the contact of the protruding portion 101h with the protrusion 102p, the flowable mixture 104 is injected into the mold cavity 102i as shown in FIG. 31. The flowable mixture 104 is discharged from the outlets 101c of the injectors 101a into the mold cavity 102i through the opening 102h and the feeding ports 102j. In some embodiments, the flowable mixture 104 is supplied by the flowable mixture supplying unit 103 connected to the injectors 101a. In some embodiments, a composition of the flowable mixture 104 is similar to the flowable mixture prepared by the supplying unit 103 as discussed above, and repeated description is omitted for a sake of brevity.

In some embodiments, during the injection of the flowable mixture 104, the outlets 101c are engaged with the molding device 102, the protruding portion 101d of the first element 101b is abutted against the protrusion 102f of the second element 102s, and the protruding portion 101h of the third element 101g is abutted against the protrusion 102p of the fourth element 102o. During the injection of the flowable mixture 104 into the mold cavity 102i by the injectors 101a, an injection force I is generated towards the molding device 102. In some embodiments, the injection force I acts on the molding device 102 to push the molding device 102 away from the injection unit 101, and as a result a counter force C acting on the protruding portion 101d by the protrusion 102f is generated. The protruding portion 101d abuts against the protrusion 102f and the protruding portion 101h abuts against the protrusion 102p during the injection of the flowable mixture 104. Therefore, an engagement of the first element 101b and the second element 102s, an engagement of the third element 101g and the second element 102s as well as an engagement of the outlet 101c and the feeding port 102j are secured. The flowable mixture 104 flowing out of the mold cavity 102i can be minimized or even prevented.

Figure 32:
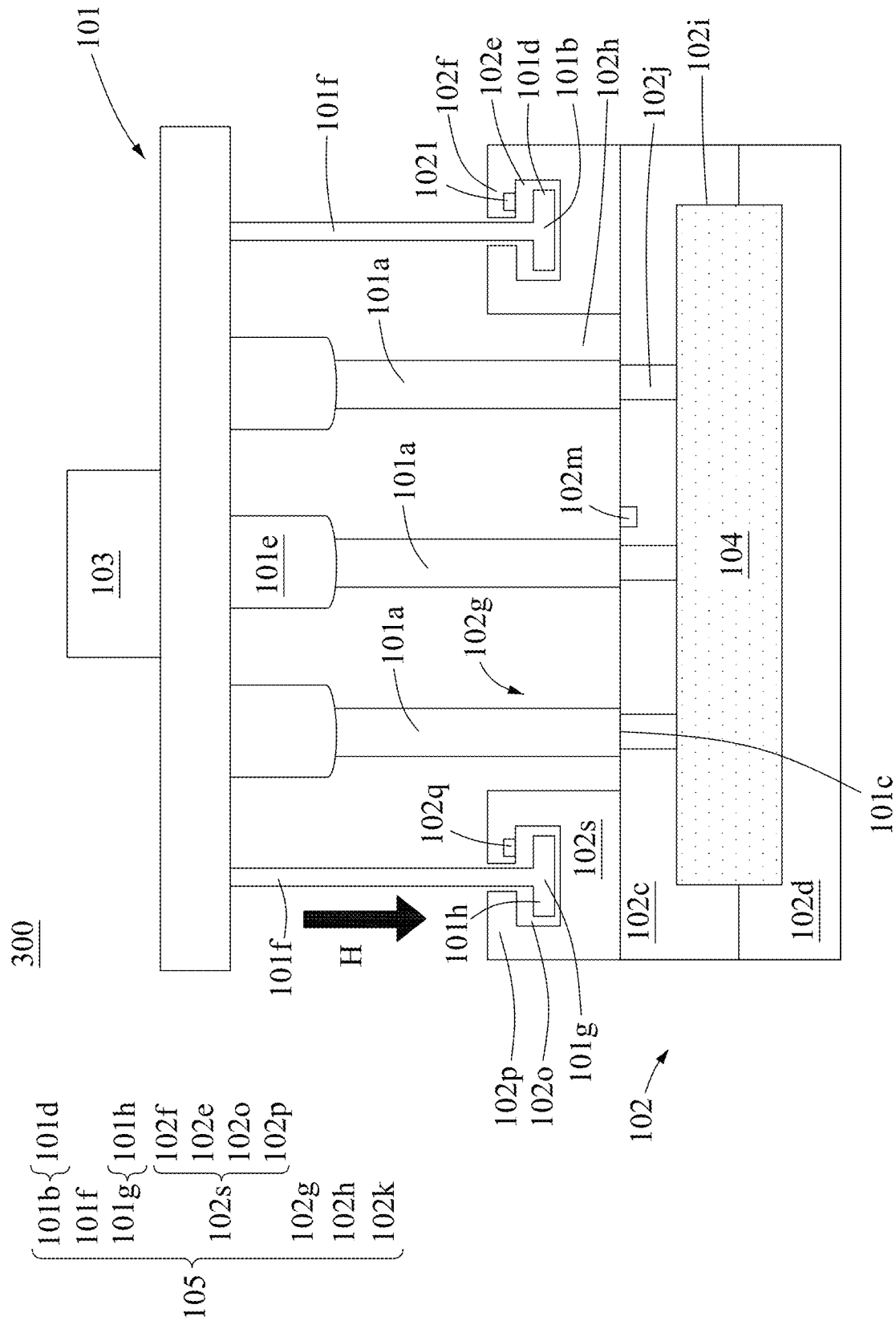

In operation 411, referring to FIG. 32, the first element 101b and the third element 101g are displaced towards the second element 102s after the injection of the flowable mixture 104. In some embodiments, the protruding portion 101d of the first element 101b is disengaged from the protrusion 102f of the second element 102s and the protruding portion 101h of the third element 101g is disengaged from the protrusion 102p of the second element 102s after the injection of the flowable mixture 104 while the protruding portion 101d of the first element 101b is received by the first slot 102e of the second element 102s and the protruding portion 101h of the third element 101g is received by the second slot 102e of the second element 102s.

In some embodiments, after the injection of the flowable mixture 104, the first element 101b and the third element 101g are displaced towards the second element 102s along an arrow H as shown in FIG. 32, until the first element 101b is disengaged from the second element 102s. In some embodiments, the protruding portion 101d is moved away from the protrusion 102f, and the protruding portion 101h is moved away from the protrusion 102p. In some embodiments, the first element 101b is moved toward the molding device 102 to disengaged from the protrusion 102f, and the third element 101g is moved toward the molding device 102 to disengaged from the protrusion 102p. In some embodiments, the injectors 101a remain stationary when the first element 101b and the third element 101g are moving downward as shown in FIG. 32. In some embodiments, a separation of the protrusion 102f and the protruding portion 101d of the first element 101b is sensed by the first sensor 102l, and a separation of the protrusion 102p and the protruding portion 101h of the third element 101g is sensed by the third sensor 102q.

Figure 33:
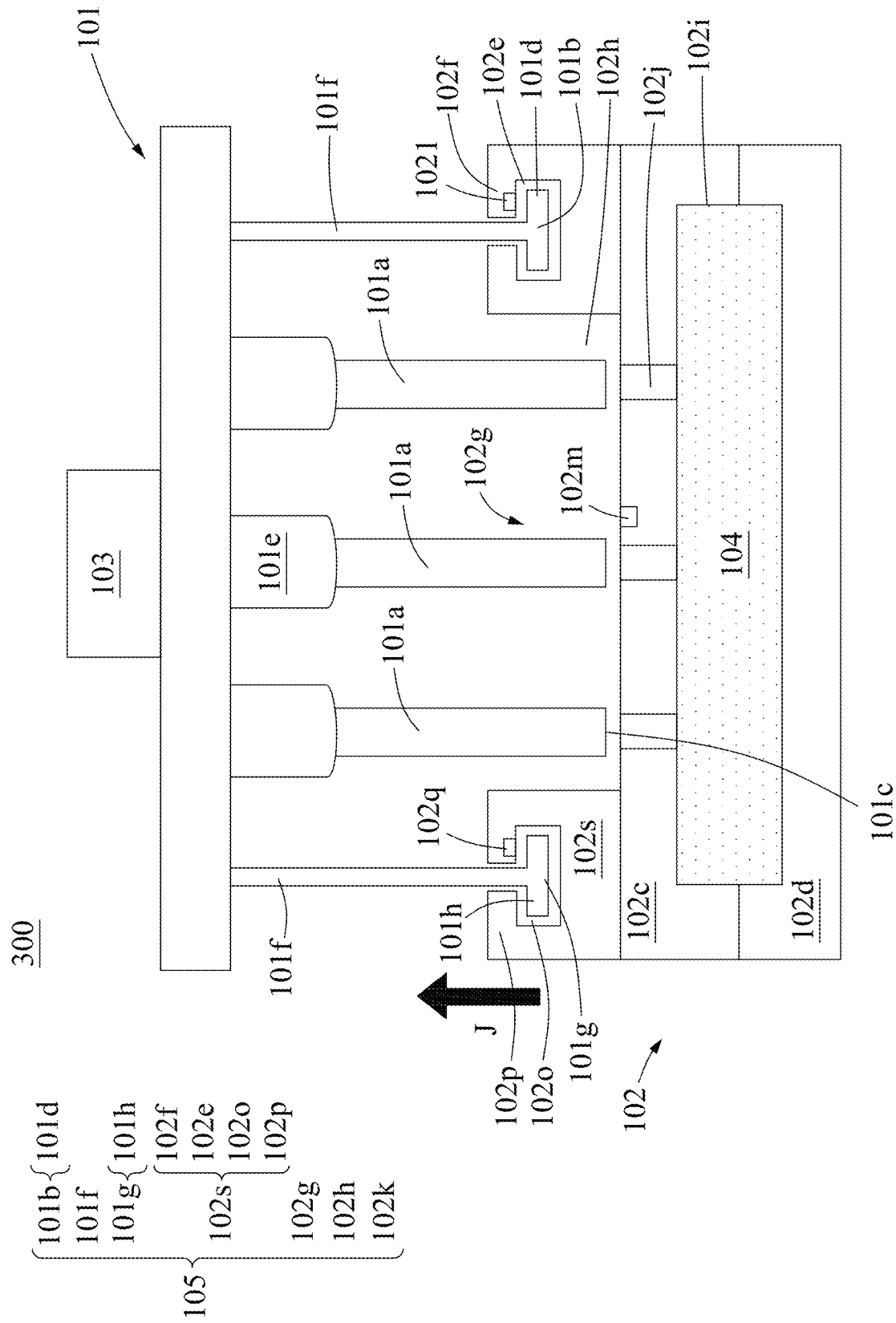

In operation 412, referring to FIG. 33, the injectors 101a are displaced away from the molding device 102. In some embodiments, the outlets 101c are retracted away from the molding device 102 after the injection of the flowable mixture 104.

In some embodiments, after the disengagement of the first element 101b and the third element 101g from the second element 102s, the injectors 101a move away from the molding device 102 along an arrow J as shown in FIG. 33, until the outlets 101c of the injectors 101a are not in contact with the molding device 102. In some embodiments, a separation of the injectors 101a and the molding device 102 is sensed by the second sensor 102m. In some embodiments, the injectors 101a, the first element 101b and the third element 101g move away from the molding device 102 along the arrow J. In some embodiments, the injectors 101a, the first element 101b and the third element 101g are moved consistently.

Figure 34:
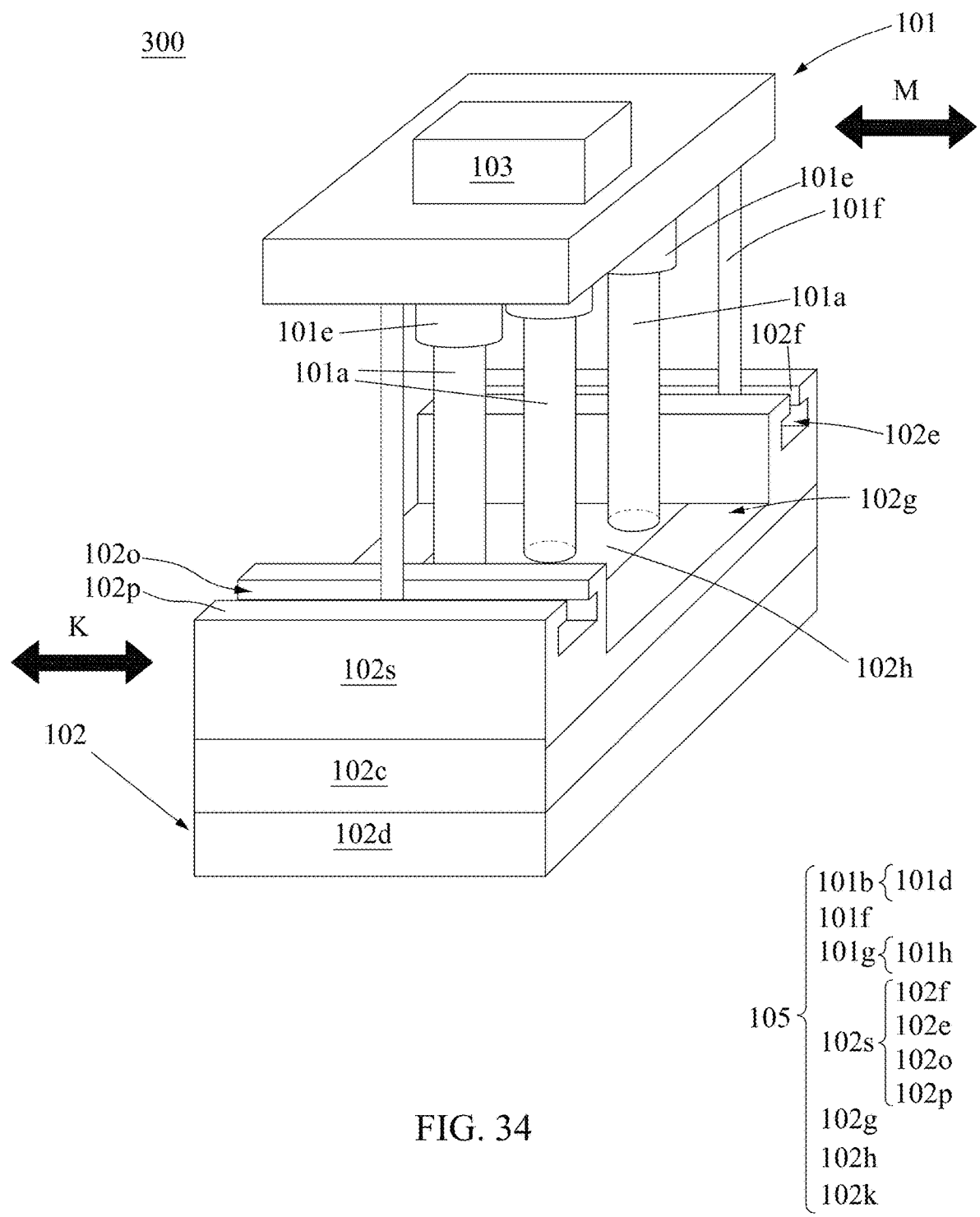
Figure 35:
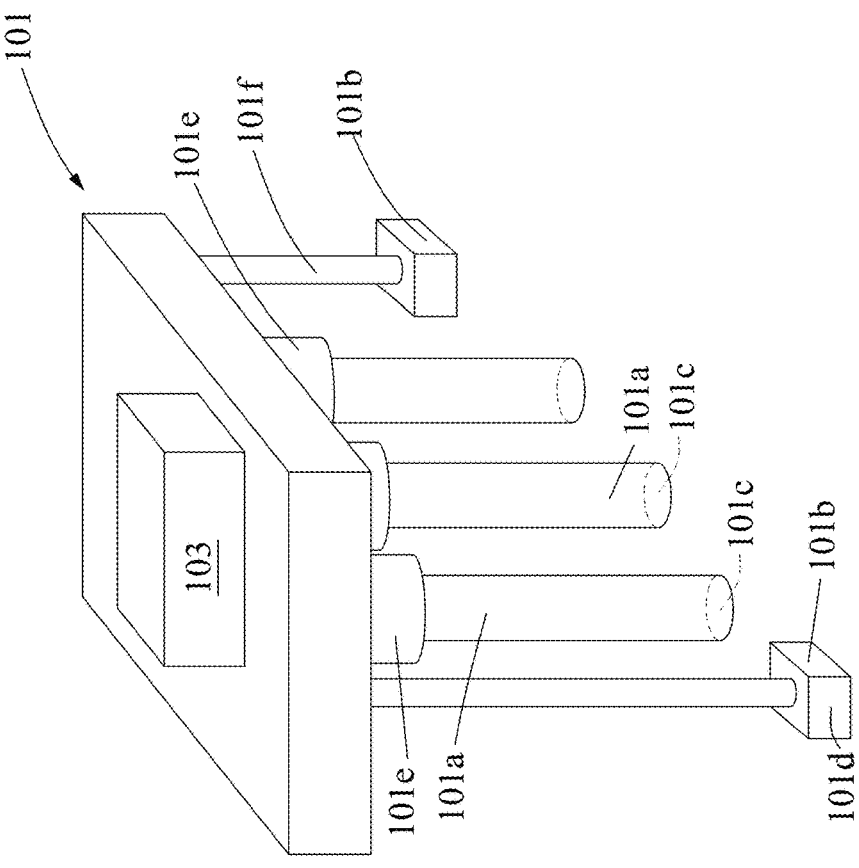
Figure 35:
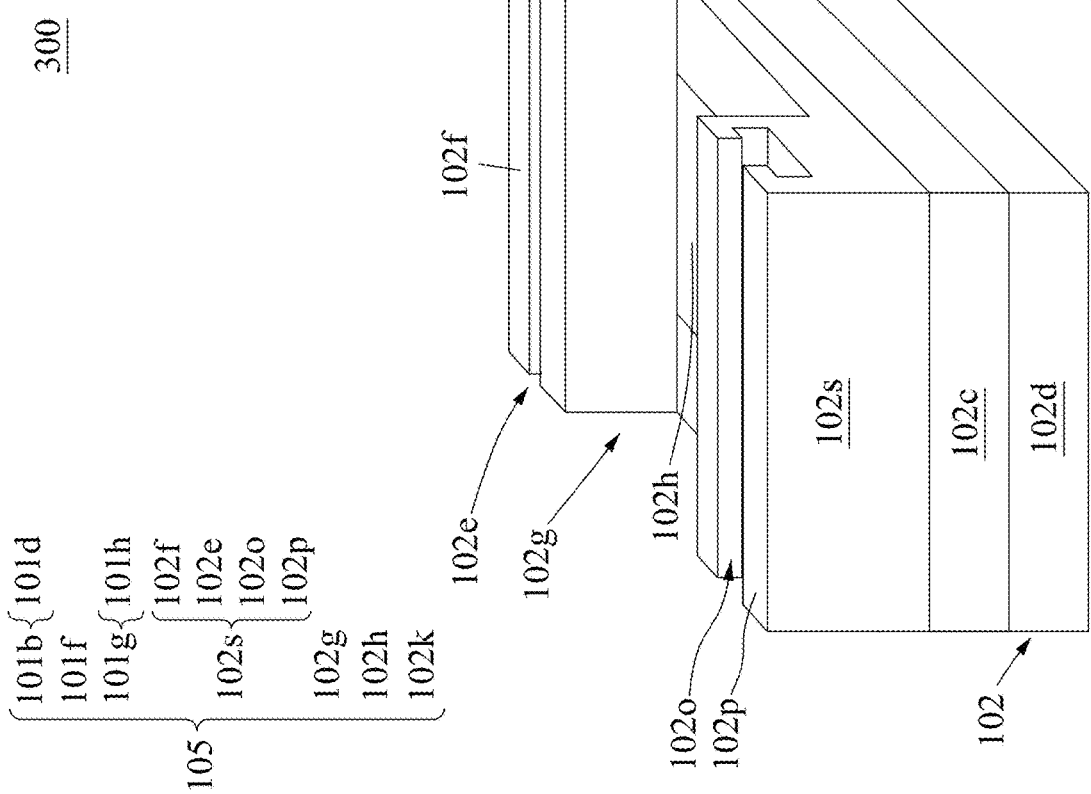

In operation 413, referring to FIGS. 34 and 35, the molding device 102 is displaced away from the injection unit 101 or displacing the injection unit 101 away from the molding device 102.

In some embodiments, after the disengagement of the injectors 101a, the first element 101b and the third element 101g from the second element 102s, the molding device 102 is displaced away from the injection unit 101. Alternatively, after the disengagement of the injectors 101a, the first element 101b and the third element 101g from the second element 102s, the injection unit 101 is displaced away from the second element 102s. In some embodiments, the molding device 102 is horizontally moved away from the injectors 101a, the first element 101b and the third element 101g along an arrow K as shown in FIG. 34. Alternatively, the injectors 101a, the first element 101b and the third element 101g are horizontally moved away from the second element 102s and the molding device 102 along an arrow M as shown in FIG. 34. FIG. 35 illustrates the injection unit 101 and the second element 102s are away from each other after the displacement of the second element 102s away from the injection unit 101.

Figure 36:
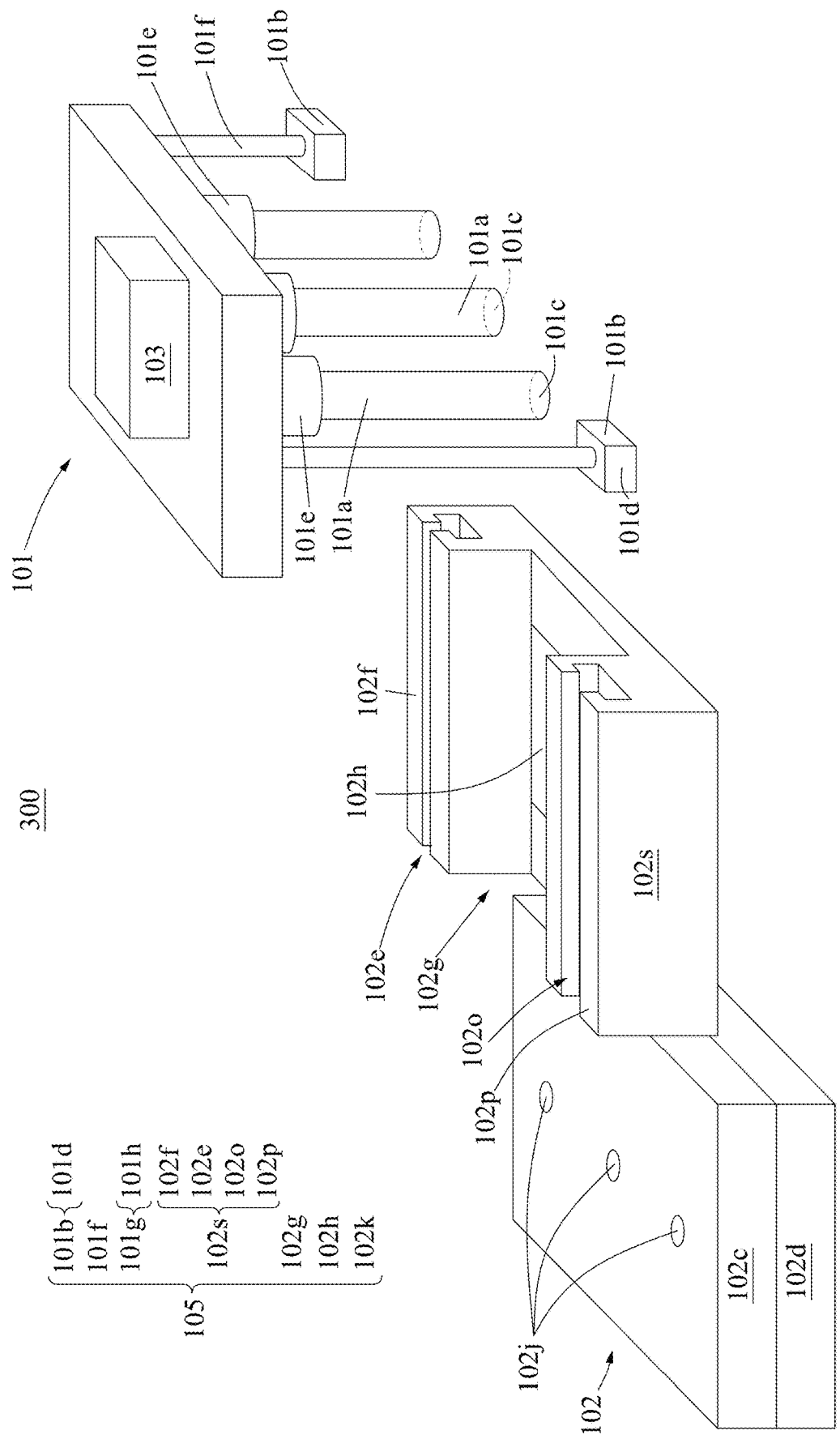

In some embodiments, after the disengagement of the molding device 102 from the second element 102s, the molding device 102 is displaced away from the second element 102s. In some embodiments, the molding device 102 is horizontally moved away from the second element 102s along an arrow K as shown in FIG. 35. In some embodiments, the molding device 102 is displaced away from the second element 102s by rotating a carrier (not shown) disposed under the molding device 102, and another molding device (not shown) may disposed under the second element 102s. Alternatively, after the disengagement of the second element 102s from the molding device 102, the injection unit 101, the molding device 102 and the second element 102s are separated from each other. In some embodiments, the molding device 102 is horizontally moved away from the second element 102s. Alternatively, the second element 102s are horizontally moved away from the molding device 102. FIG. 36 illustrates the second element 102s and the molding device 102 are away from each other after the displacement of the molding device 102 away from the second element 102s.

In the present disclosure, a third injection molding method 500 is also disclosed. The third injection molding method 500 includes a number of operations, and the description and illustrations are not deemed as a limitation of the sequence of the operations. FIG. 37 is an embodiment of the third injection molding method 500. In some embodiments, the third injection molding method 500 includes a number of operations (501 to 506). In some embodiments, the third injection molding method 500 is implemented by the first injection molding system 100 as illustrated in FIGS. 1-5 or the second injection molding system 300 as illustrated in FIGS. 19-23 and discussed above.

In operation 501, an injection molding system is provided, wherein the injection molding system includes an injection unit and a molding device, the injection unit includes an outlet configured to discharge a flowable mixture, and the molding device is configured to receive the flowable mixture from the outlet and includes a mold cavity and a feeding port communicable with the mold cavity and correspondingly engageable with the outlet.

In operation 502, a supporting device configured to facilitate an engagement of the injection unit and the molding device is provided, wherein the supporting device includes a first element connected to the injection unit and a second element disposed on the molding device.

In operation 503, a protruding portion of the first element is aligned with a slot of the second element.

In operation 504, the injection unit is displaced to slide the protruding portion of the first element along the slot of the second element In operation 505, the outlet is displaced in an opening of the second element to engage with the feeding port when the protruding portion of the first element is engaged with the slot of the second element.

In operation 506, the flowable mixture is injected into the mold cavity.

An aspect of this disclosure relates to an injection molding system. The injection molding system includes a supplying unit configured to supply a flowable mixture of a polymeric material and a blowing agent; an injection unit communicable with the supplying unit, wherein the injection unit includes an outlet disposed distal from the supplying unit and configured to discharge the flowable mixture; a molding device configured to receive the flowable mixture from the outlet and including a mold cavity and a feeding port communicable with the mold cavity and engageable with the outlet; and a supporting device disposed between the injection unit and the molding device and configured to facilitate an engagement of the injection unit and the molding device. The supporting device includes a first element connected to the injection unit and a second element disposed on the molding device. The second element includes a first slot configured to receive a protruding portion of the first element, the protruding portion of the first element is slidable within and along the first slot of the second element.

In some embodiments, the second element includes an opening configured to receive the outlet of the injection unit. In some embodiments, the second element further includes a protrusion for defining the first slot, and the first slot and the protrusion are laterally elongated. In some embodiments, the protruding portion of the first element is engageable with the protrusion and slidable within the slot. In some embodiments, the second element further includes a groove configured to receive the outlet, and the groove is laterally elongated along the second element and in parallel to the first slot. In some embodiments, the outlet is slidable within and along the groove. In some embodiments, the second element further includes an opening is disposed within the groove. In some embodiments, a first sensor is disposed within the first slot and configured to sense a contact of the protruding portion and the first slot. In some embodiments, a second sensor is disposed within the groove and configured to sense a contact of the outlet and the groove. In some embodiments, a height of the first slot is greater than a thickness of the protruding portion of the first element. In some embodiments, the supporting device further includes a third element connected to the injection unit, and the first slot is configured to receive the first element and the third element. In some embodiments, the supporting device further includes a third element connected to the injection unit, and the second element further includes a second slot configured to receive the third element.

An aspect of this disclosure relates to an injection molding method. The molding method includes: providing an injection molding system, wherein the injection molding system includes an injection unit and a molding device, the injection unit includes an outlet configured to discharge a flowable mixture, and the molding device is configured to receive the flowable mixture from the outlet and includes a mold cavity and a feeding port communicable with the mold cavity and correspondingly engageable with the outlet; providing a supporting device configured to facilitate an engagement of the injection unit and the molding device, wherein the supporting device includes a first element connected to the injection unit and a second element disposed on the molding device; aligning a protruding portion of the first element with a slot of the second element; displacing the injection unit to slide the protruding portion of the first element along the slot of the second element; displacing the outlet in an opening of the second element to engage the outlet with the feeding port when the protruding portion of the first element is engaged with the slot of the second element; and injecting the flowable mixture into the mold cavity.

In some embodiments, the method further includes aligning the outlet with a groove configured to receive the outlet, the groove is laterally elongated along the second element and in parallel to the slot; and sliding the outlet into the groove. In some embodiments, the alignment of the protruding portion of the first element with the slot of the second element and the alignment of the outlet with the groove are performed simultaneously. In some embodiments, the method further includes extending the outlet toward the molding device to engage the outlet with the feeding port; and retracting the outlet away from the molding device after the injection of the flowable mixture. In some embodiments, the method further includes moving the protruding portion of the first element to abut against a protrusion of the second element while the protruding portion of the first element is received by the slot of the second element; and disengaging the protruding portion of the first element from the slot of the second element after the injection of the flowable mixture, wherein the slot is defined by the protrusion. In some embodiments, the first element is moved away from the molding device to abut against the protrusion, and moved toward the molding device to disengage from the protrusion. In some embodiments, the method further includes moving the protruding portion of the first element toward the molding device after the injection of the flowable mixture while the protruding portion of the first element is received by the slot of the second element; wherein the injection unit remains stationary when the supporting device is moving toward the molding device. In some embodiments, during the injection the flowable mixture, the protruding portion of the first element abuts against a protrusion of the second element, and the outlet is communicable with the feeding port.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. An injection molding system, comprising:
    a supplying unit configured to supply a flowable mixture of a polymeric material and a blowing agent;
    an injection unit communicable with the supplying unit, wherein the injection unit includes an outlet disposed distal from the supplying unit and configured to discharge the flowable mixture;
    a molding device configured to receive the flowable mixture from the outlet and including:
        a mold cavity; and
        a feeding port communicable with the mold cavity and engageable with the outlet; and
    a supporting device disposed between the injection unit and the molding device and configured to facilitate an engagement of the injection unit and the molding device,
    wherein the supporting device includes a first element connected to the injection unit and a second element disposed between the molding device and the injection unit, the second element includes a first slot configured to receive a protruding portion of the first element, the protruding portion of the first element is slidable within and along the first slot of the second element, and the outlet and the first element are individually extendable toward and retractable from the molding device.

2. The injection molding system of claim 1, wherein a length of the first slot equals to a width of the second element.

3. The injection molding system of claim 1, wherein the second element further includes a protrusion for defining the first slot, and the first slot and the protrusion are laterally elongated.

4. The injection molding system of claim 3, wherein the protruding portion of the first element is engageable with the protrusion.

5. The injection molding system of claim 1, wherein the second element further includes a groove configured to receive the outlet, and the groove is laterally elongated along the second element and in parallel to the first slot.

6. The injection molding system of claim 5, wherein the outlet is slidable within and along the groove.

7. The injection molding system of claim 5, wherein the second element further includes an opening disposed within the groove.

8. The injection molding system of claim 5, wherein a second sensor is disposed within the groove and configured to sense a contact of the outlet and the groove.

9. The injection molding system of claim 1, wherein a first sensor is disposed within the first slot and configured to sense a contact of the protruding portion and the first slot.

10. The injection molding system of claim 1, wherein a height of the first slot is greater than a thickness of the protruding portion of the first element.

11. The injection molding system of claim 1, wherein the supporting device further includes a third element connected to the injection unit, and the first slot is configured to receive the first element and the third element.

12. The injection molding system of claim 1, wherein the supporting device further includes a third element connected to the injection unit, and the second element further includes a second slot configured to receive the third element.

13. An injection molding method, comprising:
    providing an injection molding system, wherein the injection molding system includes an injection unit and a molding device, the injection unit includes an outlet configured to discharge a flowable mixture, and the molding device is configured to receive the flowable mixture from the outlet and includes a mold cavity and a feeding port communicable with the mold cavity and correspondingly engageable with the outlet;
    providing a supporting device configured to facilitate an engagement of the injection unit and the molding device, wherein the supporting device includes a first element connected to the injection unit and a second element disposed between the molding device and the injection unit;
    extending the first element towards the second element to align a protruding portion of the first element with a slot of the second element;
    displacing the injection unit or the molding device to slide the protruding portion of the first element along the slot of the second element;
    extending the outlet towards the molding device in an opening of the second element to engage the outlet with the feeding port;
    retracting the first element away from the molding device to engage the protruding portion of the first element with the slot of the second element; and
    injecting the flowable mixture into the mold cavity,
    wherein the outlet and the first element are individually extendable toward and retractable away from the molding device.

14. The method of claim 13, further comprising:
aligning the outlet with a groove configured to receive the outlet, the groove is laterally elongated along the second element and in parallel to the slot; and
sliding the outlet into the groove.

15. The method of claim 14, wherein the alignment of the protruding portion of the first element with the slot of the second element and the alignment of the outlet with the groove are performed simultaneously.

16. The method of claim 13, further comprising:
retracting the outlet away from the molding device after the injection of the flowable mixture.

17. The method of claim 13, further comprising:
moving the protruding portion of the first element to abut against a protrusion of the second element while the protruding portion of the first element is received by the slot of the second element; and
disengaging the protruding portion of the first element from the slot of the second element after the injection of the flowable mixture,
wherein the slot is defined by the protrusion.

18. The method of claim 17, wherein the first element is moved away from the molding device to abut against the protrusion, and moved toward the molding device to disengaged from the protrusion.

19. The method of claim 13, further comprising:
moving the protruding portion of the first element toward the molding device after the injection of the flowable mixture while the protruding portion of the first element is received by the slot of the second element;
wherein the injection unit remains stationary when the supporting device is moving toward the molding device.

20. The method of claim 13, wherein during the injection the flowable mixture, the protruding portion of the first element abuts against a protrusion of the second element, and the outlet is communicable with the feeding port.

\* \* \* \* \*